US011125849B2

(12) United States Patent
Shi et al.

(10) Patent No.: US 11,125,849 B2
(45) Date of Patent: Sep. 21, 2021

(54) METHOD, APPARATUS, AND SYSTEM FOR POSITIONING TERMINAL DEVICE

(71) Applicant: HUAWEI TECHNOLOGIES CO., LTD., Guangdong (CN)

(72) Inventors: Zhenyu Shi, Shanghai (CN); Yi Wang, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/918,584

(22) Filed: Jul. 1, 2020

(65) Prior Publication Data
US 2020/0333424 A1   Oct. 22, 2020

Related U.S. Application Data

(63) Continuation of application No. PCT/CN2018/123748, filed on Dec. 26, 2018.

(30) Foreign Application Priority Data

Jan. 5, 2018   (CN) .......................... 201810011910.8

(51) Int. Cl.
*H04W 24/00* (2009.01)
*G01S 5/00* (2006.01)
(Continued)

(52) U.S. Cl.
CPC ............. *G01S 5/0036* (2013.01); *H04W 8/22* (2013.01); *H04W 24/10* (2013.01)

(58) Field of Classification Search
CPC ....... G01S 5/0036; H04W 8/22; H04W 24/10; H04M 1/72519; H04M 1/72522
(Continued)

(56) References Cited

U.S. PATENT DOCUMENTS

2007/0153743 A1   7/2007  Mukkavilli et al.
2009/0310501 A1*  12/2009  Catovic .................. H04W 24/08
                                                          370/252
(Continued)

FOREIGN PATENT DOCUMENTS

CN    101052192 A    10/2007
CN    101361398 A    2/2009
(Continued)

OTHER PUBLICATIONS

International Search Report dated Feb. 27, 2019, issued in counterpart Application No. PCT/CN2018/123748, with English translation (11 pages).
(Continued)

*Primary Examiner* — Danh G Le
(74) *Attorney, Agent, or Firm* — Westerman, Hattori, Daniels & Adrian, LLP

(57) ABSTRACT

Embodiments of this application disclose a method, an apparatus, and a system for positioning a terminal device. Location measurement data for a to-be-positioned terminal device is obtained by a terminal-side measurement function entity and/or an access-side measurement function entity, where the location measurement data includes a channel estimation and/or a channel impulse response that are/is obtained based on a corresponding downlink/uplink reference signal. The terminal-side measurement function entity and/or the access-side measurement function entity report/reports the location measurement data to a positioning service function entity in a network, so that the positioning function entity can estimate a location of the terminal device based on the location measurement data, thereby positioning the terminal device and improving positioning accuracy. This technical solution can be applied to both a single-base-station-based positioning environment and a multi-base-
(Continued)

station-based positioning environment, to position the terminal device.

15 Claims, 11 Drawing Sheets

(51) Int. Cl.
*H04W 8/22* (2009.01)
*H04W 24/10* (2009.01)

(58) Field of Classification Search
USPC .............................. 455/456.1, 456.5, 550.1
See application file for complete search history.

(56) References Cited

U.S. PATENT DOCUMENTS

| | | | | |
|---|---|---|---|---|
| 2011/0034189 | A1* | 2/2011 | Anjaria | H04B 17/3913 455/500 |
| 2011/0065453 | A1 | 3/2011 | Baldemair et al. | |
| 2011/0070892 | A1 | 3/2011 | Islam | |
| 2013/0114442 | A1* | 5/2013 | Park | H04B 7/18513 370/252 |
| 2014/0128087 | A1* | 5/2014 | Zhang | H04W 64/006 455/450 |
| 2015/0133157 | A1 | 5/2015 | Xiao et al. | |
| 2016/0007222 | A1 | 1/2016 | Siomina et al. | |
| 2016/0227373 | A1* | 8/2016 | Tsai | G01S 5/0284 |
| 2016/0359601 | A1* | 12/2016 | Xu | H04W 72/0446 |
| 2016/0365904 | A1* | 12/2016 | Sayeed | H04W 64/00 |
| 2017/0238618 | A1* | 8/2017 | Blibech | A41B 9/02 |
| 2020/0112867 | A1* | 4/2020 | Opshaug | H04W 4/029 |
| 2020/0322805 | A1* | 10/2020 | Wang | G01S 19/215 |

FOREIGN PATENT DOCUMENTS

| | | |
|---|---|---|
| CN | 102067632 A | 5/2011 |
| CN | 102111709 A | 6/2011 |
| CN | 103139905 A | 6/2013 |
| CN | 105472735 A | 4/2016 |
| CN | 107294884 A | 10/2017 |
| WO | 2011105946 A1 | 9/2011 |
| WO | 2011139201 A1 | 11/2011 |
| WO | 2017043867 A1 | 3/2017 |

OTHER PUBLICATIONS

Extended Search Report dated Oct. 12, 2020, issued in conterpart EP Application No. 18898228.4 (13 pages).
Office Action dated Jun. 22, 2020, issued in counterpart CN Application No. 201810011910.8, with English translation (17 pages).
Office Action dated Mar. 3, 2021, issued in counterpart CN Application No. 201810011910.8, with English Translation. (18 pages).

* cited by examiner

METHOD, APPARATUS, AND SYSTEM FOR POSITIONING TERMINAL DEVICE

CROSS-REFERENCE TO RELATED APPLICATIONS

This application is a continuation of International Application No. PCT/CN2018/123748, filed on Dec. 26, 2018, which claims priority to Chinese Patent Application No. 201810011910.8, filed on Jan. 5, 2018. The disclosures of the aforementioned applications are hereby incorporated by reference in their entireties.

TECHNICAL FIELD

This application relates to the field of communications technologies, and in particular, to a terminal device positioning technology in a communications system.

BACKGROUND

With development of communications technologies and increasing popularization of mobile devices, people have an increasing requirement on a positioning service of their own locations. With emergence of new industries such as autonomous driving, smart city, and internet of things (IoT), communications technologies are increasingly converged with these vertical industries. These vertical industries also have positioning requirements. In an original long term evolution (Long Term Evolution, LTE for short) system, positioning may reach accuracy of approximately 20 m to 30 m, to basically meet a general requirement. The convergence of the vertical industries poses higher requirements on the current positioning, and a higher-speed and higher-accuracy positioning manner is expected. This brings a great challenge to a next-generation positioning technology.

A main challenge to the positioning technology in a wireless network is brought by user mobility and a change in an external environment. Quality of the positioning technology is also mainly measured by using two indicators: positioning accuracy and a positioning calculation time. For different scenarios (outdoor, indoor, static, and mobile), requirements on these indicators vary with different applications. A global positioning system (Global Positioning System, GPS for short) is currently a most widely applied technology. However, although the GPS has high positioning accuracy mainly in outdoor and suburban scenarios, positioning accuracy of the GPS in indoor and urban scenarios is not very ideal. However, in a current wireless communications system, more than half of mobile devices work indoors. To improve the positioning accuracy and make the positioning accuracy meet positioning requirements in various scenarios, in LTE, different base station-based positioning technology methods are used, and mainly include an observed time of arrival (Time of Arrival, TOA for short), a time difference of arrival (Observed Time Difference of Arrival, OTDOA for short), an uplink time difference of arrival (Uplink Time Difference of Arrival, UTDOA for short), and a direction of arrival (Direction of Arrival, DOA for short), which may also be referred to as an angle of arrival (Angle of Arrival, AOA for short). To further improve the positioning accuracy, the foregoing methods may also be used in a mixed manner.

First, by analyzing indicators for the positioning accuracy in the technologies mentioned above, it can be found that the positioning accuracy can reach only tens of meters, and cannot meet a higher accuracy requirement. With development of network services, user positioning accuracy needs to be improved urgently.

Further, specifically, in a common positioning scenario, for example, positioning based on distance information and direction (angle) information, positioning is mainly implemented by measuring a time of arrival (Time of Arrival, TOA for short), a time difference of arrival (Time Difference of Arrival, TDOA for short), and a DOA of a specific positioning reference signal (Positioning Reference Signal, PRS for short). Specifically, the TOA and the TDOA indicate distances from a target user to different base stations. When location coordinates of the three base stations are known, the target user is positioned by using a three-point positioning method. The DOA indicates an angle between the target user and the base station. The user is positioned based on the distance between the target user and the base station. For another example, positioning is performed based on fingerprint recognition. In this method, an entire to-be-positioned area needs to be subdivided into small areas, and then received signal strengths (received signal strength, RSS for short) of user-specific reference signals received by a plurality of sensors are recorded in each area, to generate a table. When a target user needs to be positioned, RSSs received by the plurality of sensors may be compared with those in the previously generated table, and a corresponding area is found by using a table lookup method. Certainly, a smaller divided area indicates higher positioning accuracy, but also indicates a longer time for establishing a table and higher calculation complexity. In the foregoing two common positioning scenarios, a plurality of base stations/sensors need to participate in positioning, and an additional reference signal needs to be transmitted.

It can be learned that, location measurement data used in the existing positioning technology mainly has a technical problem that positioning accuracy cannot meet a requirement of a future network. Further, in the existing positioning technology, there is also a technical problem of a great positioning processing limitation because positioning requires participation of a plurality of nodes and an additional positioning-specific positioning reference signal needs to be transmitted in a positioning process.

SUMMARY

This application provides a method, an apparatus, and a system for positioning a terminal device, to implement high-accuracy and low-limitation terminal device positioning by using more valid measurement data.

According to a first aspect, a method and an apparatus for positioning a terminal device are provided.

In a possible design, the method is applied to a terminal device, and the terminal device is positioned by using more valid measurement data. The method includes: sending, by the terminal device, measurement data to a positioning service function entity, where the measurement data is obtained based on a downlink reference signal received by the terminal device, the measurement data is used by the positioning service function entity to estimate a location of the terminal device, and the measurement data includes at least one of the following: a channel estimation and a channel impulse response. The positioning of the terminal device by using the channel estimation and/or the channel impulse response may not be limited to being implemented in a scenario in which a plurality of access nodes are required, and the positioning can also be implemented in a scenario in which there is a single access node. In addition, the downlink reference signal in this application may be a non-specific additional downlink reference signal used for positioning, for example, a downlink reference signal, such as a cell reference signal (Cell Reference Signal, CRS for short), used for downlink channel quality measurement, a downlink channel estimation, phase tracking, synchronization, or the like; or a dedicated additional positioning reference signal, such as a positioning reference signal (Positioning Reference Signal, PRS for short). This application is not limited to a specific positioning reference signal. After receiving the measurement data, the positioning service function entity may estimate the location of the terminal device based on the measurement data, to position the terminal device.

It may be understood that before sending the measurement data, the terminal device has received the downlink reference signal, and obtained the measurement data based on the received downlink reference signal.

In this design, the terminal device can report, to the positioning service function entity, the measurement data that is obtained based on the downlink reference signal and that includes the channel estimation and/or the channel impulse response, to position the terminal device, so that high-accuracy and low-limitation terminal device positioning can be implemented by using the more valid measurement data.

In a possible design, the terminal device further needs to enable the positioning service function entity to learn of a location measurement capability supported by the terminal device, and use a corresponding positioning processing manner. The terminal device sends second indication information to the positioning service function entity, to indicate the location measurement capability of the terminal device, for example, whether the terminal device supports a measurement data-based location measurement manner, where the measurement data includes the channel estimation and/or the channel impulse response. In an environment in which the terminal device supports a plurality of types of location measurement in a system, this design can enable the positioning service function entity to determine the location measurement manner that can be supported by the terminal device, so that a corresponding location estimation processing manner can be used, thereby effectively implementing positioning.

In a possible design, before sending the measurement data, the terminal device further receives first indication information that is sent by the positioning service function entity and that indicates the measurement data that needs to be obtained by the terminal device. Based on the indication information, the terminal device further obtains the corresponding measurement data and reports the measurement data to the positioning service function entity. In this design, the terminal device can obtain, as indicated by the positioning service function entity, the valid location measurement data used for positioning. This avoids data processing and transmission overheads caused by a case in which the terminal device cannot perform targeted location measurement and report the measurement data in an environment in which a plurality of location measurement manners coexist, so that the positioning service function entity can determine the location estimation processing manner that needs to be used, thereby effectively implementing positioning.

In a possible design, before sending the measurement data, the terminal device further receives assistance information sent by the positioning service function entity, where the assistance information is used to assist the terminal device in receiving the downlink reference signal to obtain the measurement data, and the assistance information may be a cell number, configuration information of the downlink reference signal, or the like. In this way, the assistance information, for example, the configuration information of the downlink reference signal, can assist the UE in learning of a base station or base stations that sends or send the downlink reference signal, and a location at which the downlink reference signal is received. Even if a plurality of access nodes are used to position the UE, the UE can quickly determine a receiving configuration of the downlink reference signal. It may be understood that the assistance information and the first indication information may be carried in a same message and sent by the positioning service function entity, or may be carried in different messages and sent by the positioning service function entity.

Correspondingly, a measurement apparatus for positioning a terminal device is provided. The apparatus can implement the corresponding positioning method according to the first aspect. For example, the apparatus is limited in a functional form, and may be a measurement function entity. A specific implementation of the apparatus may be a measurement device. For example, the apparatus may be a terminal device, or a chip or a functional module in a terminal device. The method may be implemented by software or hardware, or by hardware executing corresponding software.

In a possible design, the apparatus may include a processor and a memory. The processor is configured to support the apparatus in performing a corresponding function in the method according to the first aspect. The memory is configured to couple to the processor, and stores a program (instruction) and data that are necessary for the apparatus. In addition, the apparatus may further include a communications interface, configured to support communication between the apparatus and another network element. The communications interface may be a transceiver.

In a possible design, the apparatus may include a sending unit. The sending unit is configured to send measurement data to a positioning service function entity. Optionally, the apparatus may further include a processing unit, and the processing unit is configured to obtain the to-be-sent measurement data. The apparatus may further include a receiving unit, configured to receive a downlink reference signal and/or a message sent by the positioning service function entity.

According to a second aspect, a method and an apparatus for positioning a terminal device are provided.

In a possible design, the method is applied to a measurement apparatus for positioning a terminal device, and a corresponding terminal device in a network is positioned by using more valid measurement data. The method includes: sending, by a measurement apparatus, measurement data to a positioning service function entity, where the measurement data is obtained based on an uplink reference signal that is sent by a to-be-positioned terminal device and that is received by the measurement apparatus, the measurement data is used by the positioning service function entity to estimate a location of the terminal device, and the measurement data includes at least one of the following: a channel estimation and a channel impulse response. The positioning of the terminal device by using the channel estimation and/or the channel impulse response may not be limited to being implemented in a scenario in which a plurality of access nodes are required, and the positioning can also be implemented in a scenario in which there is a single access node. In addition, the uplink reference signal in this application may be a non-specific additional uplink reference signal used for positioning, for example, an uplink reference signal, such as a sounding reference signal (Sounding Reference Signal, SRS for short), used for uplink channel quality measurement, uplink channel estimation, phase tracking, or the like; an uplink tracking reference signal sent by UE in an inactive state in a user-centric network; a dedicated uplink positioning reference signal; or a dedicated additional positioning reference signal. This application is not limited to a specific positioning reference signal. After receiving the measurement data, the positioning service function entity may estimate the location of the terminal device based on the measurement data, to position the terminal device.

It may be understood that, before sending the measurement data, the measurement apparatus has received the uplink reference signal and obtained the to-be-sent measurement data based on the received uplink reference signal.

In this design, the measurement apparatus for positioning a terminal device can report, to the positioning service function entity, the measurement data that is obtained based on the uplink reference signal and that includes the channel estimation and/or the channel impulse response, so that high-accuracy and low-limitation terminal device positioning can be implemented by using the more valid measurement data.

In a possible design, the measurement apparatus further needs to enable the positioning service function entity to learn of a measurement capability supported by the measurement apparatus, and use a corresponding positioning processing manner. The measurement apparatus or a capability information management apparatus corresponding to the measurement apparatus sends second indication information to the positioning service function entity, to indicate a location measurement capability of the measurement apparatus, for example, whether the measurement apparatus supports a measurement data-based location measurement manner, where the measurement data includes the channel estimation and/or the channel impulse response. In an environment in which the measurement apparatus supports a plurality of types of location measurement in a system, this design can enable the positioning service function entity to determine the location measurement manner that can be supported by the measurement apparatus, so that the corresponding location estimation processing manner can be used, thereby effectively implementing positioning.

In a possible design, before sending the measurement data, the measurement apparatus further receives first indication information that is sent by the positioning service function entity and that indicates the measurement data that needs to be obtained by the measurement apparatus. Based on the indication information, the measurement apparatus further obtains the measurement data and reports the measurement data to the positioning service function entity. It may be understood that, when there is more than one measurement apparatus in the system, the positioning service function entity needs to select one or more measurement apparatuses to be used, and sends the first indication information to the selected measurement apparatus. In this design, the measurement apparatus can obtain, as indicated by the positioning service function entity, the valid measurement data used for positioning. This avoids data processing and transmission overheads caused by a case in which the measurement apparatus cannot perform targeted location measurement and report the measurement data in an environment in which a plurality of location measurement manners coexist, so that the positioning service function entity can determine the location estimation processing manner that needs to be used, thereby effectively implementing positioning.

In a possible design, before sending the measurement data, the measurement function entity further receives assistance information sent by the positioning service function entity. It may be understood that, when there is more than one measurement apparatus in the system, the positioning service function entity needs to select one or more measurement apparatuses to be used, and sends the assistance information to the selected measurement apparatus. The assistance information is used to assist the measurement apparatus in receiving the uplink reference signal to obtain measurement data, and the assistance information may be a number of a cell in which the to-be-positioned terminal device is located, configuration information of the uplink reference signal, or the like. In this way, the assistance information can assist the measurement apparatus in learning of UE that sends the uplink reference signal, a location at which the uplink reference signal is received, and the like. It may be understood that the assistance information and the first indication information may be carried in a same message and sent by the positioning service function entity, or may be carried in different messages and sent by the positioning service function entity.

Correspondingly, a measurement apparatus for positioning a terminal device is provided. The apparatus can implement the corresponding positioning method according to the second aspect. For example, the apparatus is limited in a functional form, and may be a measurement function entity. A specific implementation of the apparatus may be a measurement device. For example, the apparatus may be an access node device, or may be a chip or a functional module in an access node device. The method may be implemented by using software, hardware, or by executing corresponding software by hardware.

In a possible design, the apparatus may include a processor and a memory. The processor is configured to support the apparatus in performing a corresponding function in the method according to the second aspect. The memory is configured to couple to the processor, and stores a program (instruction) and data that are necessary for the apparatus. In addition, the apparatus may further include a communications interface, configured to support communication between the apparatus and another network element. The communications interface may be a transceiver.

In a possible design, the apparatus may include a sending unit. The sending unit is configured to send measurement data to a positioning service function entity. Optionally, the apparatus may further include a processing unit, and the processing unit is configured to obtain the to-be-sent measurement data. The apparatus may further include a receiving unit, configured to receive an uplink reference signal and/or a message sent by the positioning service function entity.

According to a third aspect, a method and an apparatus for positioning a terminal device are provided.

In a possible design, the method may be applied to a positioning service function entity such as a positioning service center or an evolved serving mobile location center (Enhanced Serving Mobile Location Centre, E-SMLC for short), to position a terminal device by using more valid measurement data. The method includes: receiving, by a positioning service function entity, measurement data that is sent by a location measurement function entity and that is for a to-be-positioned terminal device, where the measurement data is used by the positioning service function entity to estimate a location of the terminal device. The measurement data may be obtained and reported by the to-be-positioned terminal device by performing location measurement, or may be obtained and reported by an access-side measurement apparatus by performing location measurement. Therefore, the location measurement function entity includes the to-be-positioned terminal device and/or access-side measurement apparatus. The measurement data may be obtained based on a downlink reference signal received by the terminal device and/or an uplink reference signal sent by the to-be-positioned terminal device and received by the measurement apparatus. The measurement data includes at least one of the following: a channel estimation and a channel impulse response.

It may be understood that after obtaining the measurement data that includes the channel estimation and/or the channel impulse response, the positioning service function entity may estimate the location of the terminal device based on the measurement data. Optionally, the positioning service function entity pre-establishes a model of a correspondence between the measurement data and the location of the terminal device. During positioning, the positioning service function entity may estimate the location of the terminal device based on the model.

In this design, the positioning service function entity receives the measurement data that is reported by the location measurement function entity, that is obtained based on the uplink and/or downlink reference signal, and that includes the channel estimation and/or the channel impulse response, and uses the measurement data for positioning the terminal device, so that high-accuracy and low-limitation terminal device positioning can be implemented by using the more valid measurement data.

In a possible design, the positioning service function entity further needs to learn of a measurement capability supported by the location measurement function entity, to use a corresponding positioning processing manner. The positioning service function entity receives second indication information sent by the location measurement function entity or a capability information management apparatus corresponding to the location measurement function entity, to indicate the location measurement capability of the location measurement function entity, for example, whether the location measurement function entity supports a measurement data-based location measurement manner, where the measurement data includes the channel estimation and/or the channel impulse response. In an environment in which the location measurement function entity supports a plurality of types of location measurement in a system, this design can enable the positioning service function entity to determine the location measurement manner that can be supported by the location measurement function entity, so that a corresponding location estimation processing manner can be used, thereby effectively implementing positioning.

In a possible design, before receiving the measurement data, the positioning service function entity further sends, to the location measurement function entity, first indication information indicating the measurement data that needs to be obtained by the measurement apparatus. Based on the indication information, the location measurement function entity further obtains the measurement data and reports the measurement data to the positioning service function entity. It may be understood that, when there is more than one location measurement function entity in the system, the positioning service function entity needs to select one or more location measurement function entities to be used, and sends the first indication information to the selected location measurement function entity. In this design, the location measurement function entity can obtain, as indicated by the positioning service function entity, the valid measurement data used for positioning. This avoids data processing and transmission overheads caused by a case in which the location measurement function entity cannot perform targeted location measurement and report the measurement data in an environment in which a plurality of location measurement manners coexist, so that the positioning service function entity can determine the location estimation processing manner that needs to be used, thereby effectively implementing positioning.

In a possible design, before receiving the measurement data, the positioning service function entity further sends assistance information to the location measurement function entity. It may be understood that, when there is more than one location measurement function entity in the system, the positioning service function entity needs to select one or more location measurement function entities to be used, and sends the assistance information to the selected location measurement function entity. The assistance information is used to assist the location measurement function entity in receiving the uplink and/or downlink reference signal to obtain the measurement data, and the assistance information may be a cell number, configuration information of the uplink reference signal, or the like. In this way, the assistance information can assist the location measurement function entity in learning of an object that sends the uplink/downlink reference signal, a location at which the reference signal is received, and the like. It may be understood that the assistance information and the first indication information may be carried in a same message and sent by the positioning service function entity, or may be carried in different messages and sent by the positioning service function entity.

Correspondingly, a positioning apparatus for positioning a terminal device is provided. The apparatus can implement the corresponding positioning method according to the third aspect. For example, the apparatus is limited in a functional form, and may be a positioning service function entity. A specific implementation form of the apparatus may be a positioning device or a positioning server. Alternatively, the apparatus may be a chip or a functional module in a positioning service function entity. The method may be implemented by software, hardware, or by hardware executing corresponding software.

In a possible design, the apparatus may include a processor and a memory. The processor is configured to support the apparatus in performing a corresponding function in the method according to the third aspect. The memory is configured to couple to the processor, and stores a program (instruction) and data that are necessary for the apparatus. In addition, the apparatus may further include a communications interface, configured to support communication between the apparatus and another network element. The communications interface may be a transceiver.

In a possible design, the apparatus may include a receiving unit. The receiving unit is configured to receive measurement data that is sent by a location measurement function entity and that is for a terminal device. Optionally, the apparatus may further include a processing unit, and the processing unit is configured to estimate a location of the terminal device based on the measurement data. The apparatus may further include a sending unit, configured to send a message to the location measurement function entity.

This application further provides a computer storage medium, and the computer storage medium stores a computer program (instruction). When the program (instruction)

is run on a computer, the computer is enabled to perform the method according to any one of the foregoing aspects.

This application further provides a computer program product. When the computer program product is run on a computer, the computer is enabled to perform the method according to any one of the foregoing aspects.

This application further provides a chip for positioning a terminal device. The chip stores an instruction. When the instruction is run on a communications device, the communications device is enabled to perform the corresponding methods according to the foregoing aspects.

This application further provides an apparatus for positioning a terminal device. The apparatus includes a memory, a processor, and a computer program that is stored in the memory and that can be run on the processor. When executing the computer program, the processor implements the corresponding methods according to the foregoing aspects.

This application further provides an apparatus for positioning a terminal device. The apparatus includes a processor. The processor is configured to: couple to a memory, read an instruction in the memory, and implement, according to the instruction, the corresponding methods according to the foregoing aspects. It may be understood that the memory may be integrated into the processor, or may exist independently outside of the processor.

This application further provides an apparatus for positioning a terminal. The apparatus includes a processor. When executing a computer program, the processor implements the corresponding methods according to the foregoing aspects.

This application further provides a system for positioning a terminal. The system includes the positioning service function entity according to the third aspect, and the measurement apparatus according to the first aspect and/or the measurement apparatus according to the second aspect. These system components separately implement the corresponding methods according to the foregoing aspects.

It may be understood that any one of the apparatus, computer storage medium, computer program product, chip, or system for positioning a terminal that is provided above is configured to implement the corresponding method provided above. Therefore, for beneficial effects that can be achieved by the apparatus, computer storage medium, computer program product, chip, or system for positioning a terminal, refer to the beneficial effects of the corresponding method, and details are not described herein again.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the embodiments of this application and these accompanying drawings without creative efforts.

DESCRIPTION OF EMBODIMENTS

Figure 1:
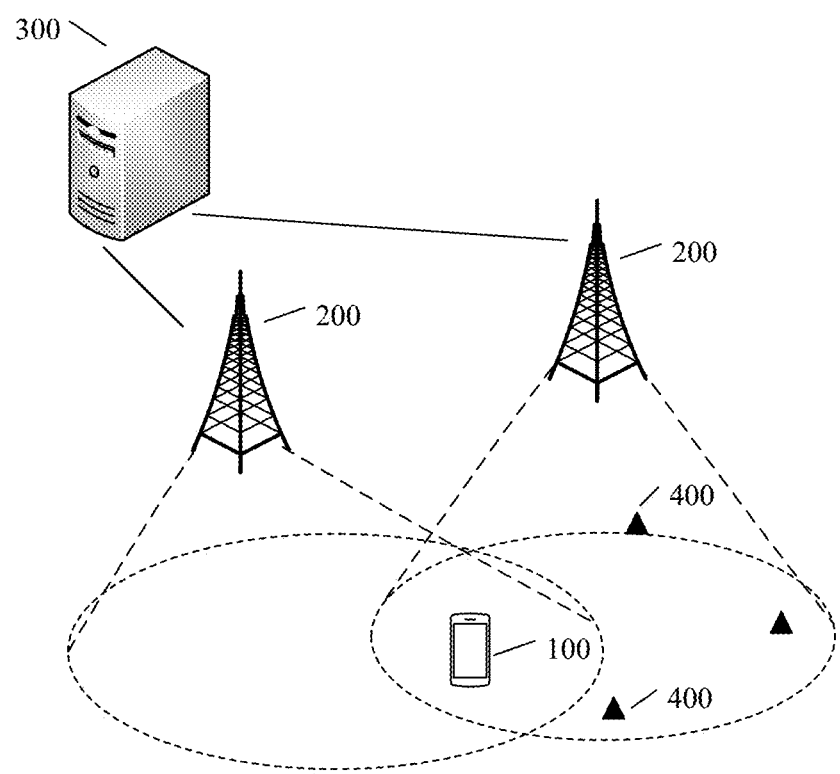
FIG. 1 shows an architecture of a network system in this application.

To make the technical problems resolved, the technical solutions used, and the technical effects achieved in this application clearer, the following describes the technical solutions in this application with reference to the accompanying drawings in the embodiments. The detailed descriptions provide various embodiments of a device and/or a process by using block diagrams, flowcharts, and/or examples. These block diagrams, flowcharts, and/or examples include one or more functions and/or operations, so that a person in the art may understand that each function and/or operation in the block diagrams, the flowcharts, and/or the examples may be performed independently and/or jointly by using much hardware, software, and firmware, and/or any combination thereof.

"A plurality of" in this application refers to two or more than two. The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In this application, the terms "first", "second", and the like are intended to distinguish between different objects but do not indicate a particular order of the objects.

In this application, nouns "network" and "system" are usually interchangeably used, but a person skilled in the art can understand meanings of the nouns. In some cases, all "terminals"/"terminal devices" mentioned in this application may be mobile devices, for example, mobile phones, personal digital assistants, handheld or laptop computers, and similar devices having a telecommunications capability. In some cases, the "terminals"/"terminal devices" may alternatively be wearable devices or vehicle-mounted devices, and include terminals in a future 5G network, terminals in a future evolved PLMN (Public Land Mobile Network) network, or the like. Such a terminal may include a device and a removable storage module associated with the device (for example, including but not limited to, a subscriber identification module (Subscriber Identification Module, SIM for short) application, a universal subscriber identification module (Universal Subscriber Identification Module, USIM for short) application, or a universal integrated circuit card (Universal Integrated Circuit Card, UICC for short) of a removable user identity module (Removable User Identity Module, R-UIM for short) application). Alternatively, such a terminal may include a device that does not have the module. In another case, the term "terminal"/"terminal device" may be a non-portable device having a similar capability, for example, a desktop computer, a set top box, or a network device. The term "terminal"/"terminal device" may alternatively be any hardware or software component that can provide a communication session of a user. In addition, "user terminal", "User Equipment", "UE", "site", "station", "STA", "user equipment", "user agent", "User Agent", "UA", "user apparatus", "mobile device", and "device" are substitute terms that are synonymous with the "terminal"/"terminal device" in this specification. For ease of description, in this application, the foregoing devices are collectively referred to as user equipment or UE.

An "access node" mentioned in this application is a network device, is an apparatus deployed in radio access network to provide a wireless communication function for a terminal device, and has functions such as being responsible for scheduling and configuring a downlink reference signal for UE. The access node may include various forms of macro base stations, micro base stations, relay stations, access points, and the like, including systems and devices acting as improvements of peer devices in a conventional wireless telecommunications system. Such advanced or next-generation devices may be included in a long term evolution LTE communications system, a 5G communications system, a future evolved system, or a plurality of communication fusion systems, for example, an evolved universal terrestrial radio access network NodeB (E-UTRAN NodeB, eNB for short) included in the LTE system, a new radio access NodeB (New Radio Access NodeB, NR NodeB for short) included in 5G, another radio access point, or a similar component. In systems using different radio access technologies, a device having an access node function may have different names. For ease of description, in this application, the foregoing apparatuses providing a wireless communication function for UE are collectively referred to as the access node.

In this application, the term "measurement function entity" is a function entity that is on an access side and that provides uplink location measurement for UE positioning, and may be a measurement function entity disposed on an access node, or may be a measurement function entity disposed independent of an access node. In one implementation, for example, in a user-centric network in which the network tracks user movement, the measurement function entity may be a measurement function entity on a transmission and reception point (transmission and reception point, TRP for short) in the network. All entities that implement related functions belong to the measurement function entity. In different systems and at different disposed positions, names of an entity having a function of the function entity may be different, for example, "measurement unit", "location measurement unit (location measurement Unit, LMU for short)", "measurement apparatus", "location measurement apparatus", and "location measurement function entity". For ease of description, in this application, the foregoing function entities that are on the access side and that provide uplink location measurement for UE positioning are collectively referred to as the measurement function entity.

In this application, the term "positioning service function entity" is a function entity that provides a positioning service for the UE, and may be a service function entity or a higher layer service function entity that is disposed independent of the access node, or may be a service function entity disposed on the access node. All entities that implement related functions belong to the positioning service function entity. In different systems and at different disposed positions, names of an entity having a function of the positioning service function entity may be different, for example, "positioning service center", and "evolved serving mobile location center (Enhanced Serving Mobile Location Centre, E-SMLC for short)". For ease of description, in this application, the foregoing entities that provide the positioning service for the UE are collectively referred to as the positioning service function entity.

FIG. 1 shows an architecture of a network system in this application. The system is used for positioning UE, and includes UE 100, at least one access node 200, and a positioning service function entity 300. In FIG. 1, two access nodes 200 are used as an example. A positioning system in this application may include a plurality of access nodes 200, or may include only one access node 200. Optionally, if a network is a user-centric network that tracks user movement, the system further includes at least one transmission and reception point (transmission and reception point, TRP for short) 400, and the transmission and reception point 400 has some functions of the access node 200 corresponding to an area in which the transmission and reception point 400 is located. The transmission and reception point 400 can monitor an uplink tracking reference signal sent by an inactive user who has not accessed the network. The transmission and reception point 400 monitors the uplink tracking reference signal with movement of the user in a user-centric manner. In the system shown in FIG. 1, for ease of description of divided functions, an example in which the positioning service function entity 300 and the access node 200 are separately disposed is provided. However, this is not a limitation on a relationship between the positioning service function entity 300 and the access node 200. A positioning service function may be configured on the access node 200, or the positioning service function entity 300 may be disposed on the access node 200.

Positioning of the UE 100 by the system may be triggered by a request of the UE 100, or may be triggered by a network side. For example, a public security system needs to track and position some users. In the system, data including a channel estimation and/or a channel impulse response may be obtained from a downlink reference signal sent by an access side and used as location measurement data, and the access side may also obtain, from an uplink reference signal sent by the UE 100, data including a channel estimation and/or a channel impulse response as location measurement data. Specifically, for different network environments, the access side may be the access node 200 or the TRP 400 that receives the uplink reference signal to obtain the measurement data. In an environment in which the TRP 400 receives the uplink reference signal, the UE 100 may be UE that is in an inactive state, that is not connected to the network, that is not connected to the access node 200 corresponding to the TRP 400, and the TRP 400 obtains the measurement data based on a monitored uplink tracking reference signal sent by the UE 100.

Both the UE 100 and/or an access-side measurement function entity can report, to the positioning service function entity 300 (the UE 100 and the positioning service function entity 300 are in communication connection via the access node 200), the measurement data that is obtained by the UE 100 and/or the access-side measurement function entity and that is used for positioning the UE 100. The positioning service function entity 300 has established in advance a model of a correspondence between the measurement data that includes the channel estimation and/or the channel impulse response and a location of a terminal device. After receiving the measurement data reported by the UE 100 and/or the access-side measurement function entity, the positioning service function entity 300 may estimate a location of the UE based on the model of the correspondence and the measurement data, to position the UE. If the positioning service function entity 300 obtains a plurality of groups of measurement data, a location estimation calculation result is more accurate. There may be two types of the plurality of groups of measurement data: First, the measurement data is obtained by using uplink reference signals/downlink reference signals between the UE and a plurality of measurement function entities; second, the measurement data is obtained by using an uplink reference signal and a downlink reference signal between the UE and at least one measurement function entity.

It should be noted that, FIG. 1 shows merely an example of the architecture of the network system in this application, and this application is not limited thereto. Similarly, this application may further be applied to an IEEE802.11 system, and a STA is positioned by using measurement data that includes a channel estimation and/or a channel impulse response and that is obtained by using an uplink and/or downlink reference signal between the station (Station, STA for short) and an access point (Access Point, AP for short), used as a location measurement function entity, or a measurement point corresponding to the AP, so that positioning accuracy of indoor wireless fidelity (Wireless Fidelity, WiFi for short) is improved.

Embodiment 1

Figure 2:
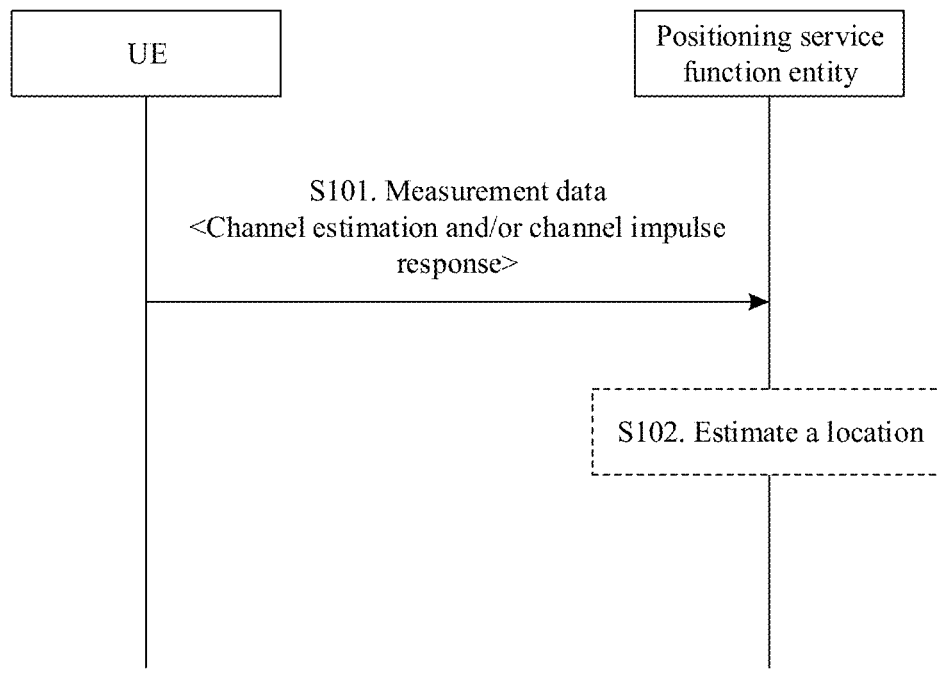
FIG. 2 is a flowchart of a first embodiment of a method for positioning a terminal device according to this application.

According to an embodiment of this application, FIG. 2 is a flowchart of a first embodiment of a method for positioning a terminal device according to this application. For ease of understanding of the solutions, during description, this embodiment and subsequent embodiments are described as a whole from perspectives of a plurality of interaction parties. However, it is not limited to a case in which steps on all interaction sides in a system need to be performed together. In the technical solutions provided in this application, improvements are made on each side in the system.

The method includes the following steps.

S101: UE sends measurement data to a positioning service function entity, and the positioning service function entity receives the measurement data.

It may be understood that the UE has obtained the measurement data before sending the measurement data to the positioning service function entity. In this application, the measurement data includes a channel estimation and/or a channel impulse response, and is obtained based on a downlink reference signal received by the UE. Optionally, the channel estimation may further include a corresponding estimated channel coefficient, for example, a channel feature parameter such as an angle of arrival AOA, a quantity of multipaths, or a delay spread. The channel estimation indicates a status of a channel through which a signal is transmitted. During the signal transmission, factors such as a delay and a multipath may cause phase and amplitude distortion of the signal. To accurately obtain information carried by the signal, a signal receive end needs to equalize and correct the distorted signal. A prerequisite for equalizing and correcting the signal is obtaining the status of the channel through which the signal is transmitted, namely, a channel estimation of the transmission channel. The receiver may obtain, by using the channel estimation, a channel impulse response, to provide cell state information (Cell State Information, CSI for short) required for subsequent coherent demodulation. The channel impulse response describes impact to be caused by the channel on the signal. The signal is transmitted from a transmitter to the receiver through the channel, and the channel affects the signal. As a result, the signal transmitted from the transmitter is different from a signal received at the receiver. The channel impulse response describes such impact, for example, as a function of time, specifically, if an instantaneous pulse (or "inrush") is transmitted from the transmitter, the channel impulse response should be a signal to be received at the receiver. If the receiver can determine the channel impulse response, the receiver usually can decode a symbol in the received signal more accurately, because the receiver can consider the impact caused by the channel on the received signal. Based on types of input data, algorithms for the channel estimation are classified into two types: time domain and frequency domain. The frequency domain method is mainly for a multi-carrier system. The time-domain method is applicable to all single-carrier and multi-carrier systems. In the method, a fading coefficient of each multipath component in a fading channel is estimated based on statistical features of reference signals or transmitted data. From a perspective of prior information of a channel estimation algorithm, channel estimation algorithms may be classified into the following three types: (1) Reference signal-based estimation: In this type of algorithm, a to-be-estimated parameter is determined according to a particular estimation criterion, or an estimated value of the to-be-estimated parameter is gradually tracked and adjusted according to some criteria. A feature of the method is that a reference signal, namely, a pilot or training sequence, needs to be used. Estimation based on a training sequence and a pilot sequence is collectively referred to as a reference signal-based estimation algorithm. A training sequence-based channel estimation algorithm is applicable to a burst-transmission system. A known training sequence is sent, and an initial channel estimation is performed at a receive end; when useful information data is sent, a decision update is performed based on an initial channel estimation result, to complete a real-time channel estimation. A pilot symbol-based channel estimation is applicable to a continuous-transmission system. A channel estimation result of a pilot location may be obtained by inserting a known pilot symbol into sent useful data; then, a channel estimation result of a useful data location is obtained through interpolation by using the channel estimation result of the pilot location, to complete a channel estimation. (2) Blind estimation: a channel estimation method that is performed by using some features that are inherent to a modulated signal and irrelevant to a specific carried information bit, or by using a decision feedback method. (3) Semi-blind estimation: a channel estimation method combining the advantages of the blind estimation and the training sequence-based estimation. Usually, a method for performing an estimation by designing a training sequence or periodically inserting a pilot symbol into data is relatively common. However, blind estimation and semi-blind channel estimation algorithms do not require a training sequence or require a relatively short training sequence, and have high spectral efficiency. Therefore, researches on the blind estimation and semi-blind channel estimation algorithms are wide. However, usually, calculation complexity of the blind estimation and semi-blind estimation methods is relatively high, and problems such as phase ambiguity (a subspace-based method), error propagation (for example, a decision feedback method), slow convergence, and local minimum may occur. Therefore, relatively long observation data is required. This limits usefulness of the methods to some extent. Optionally, the reference signal-based channel estimation is used in this application.

Optionally, in different network systems, the UE may receive downlink reference signals sent by different network devices. For example, in a network in which no transmission and reception point corresponding to an access node in a distributed manner is disposed, the UE may receive a downlink reference signal sent by the access node; in a network in which a transmission and reception point TRP corresponding to an access node in a distributed manner is disposed (one network may be a user-centric network that tracks user movement), the UE may receive a downlink reference signal sent by the transmission and reception point TRP; an uplink location measurement unit may be disposed on both an access node and a transmission and reception point TRP. Optionally, in this application, there may be a plurality of designs for the downlink reference signal for obtaining the measurement data. The downlink reference signal may be: a non-specific additional downlink reference signal used for positioning, for example, a downlink reference signal, such as a cell reference signal (Cell Reference Signal, CRS for short), used for downlink channel quality measurement, a downlink channel estimation, phase tracking, synchronization, or the like; or a dedicated additional positioning reference signal, such as a positioning reference signal (Positioning Reference Signal, PRS for short). In addition, in this application, optionally, the downlink reference signal may correspond to a single access node, or may correspond to a plurality of access nodes. The positioning system in this application does not need to use a plurality of access nodes, and may flexibly select a single access node or a plurality of access nodes.

The UE performs location measurement by using the received downlink reference signal, and may calculate a channel estimation on each carrier.

For calculation of the channel impulse response, there are also related implementations in the related art, and various implementations may be used. This is not limited herein. In this application, the following example is used to describe calculation of the impulse response, and this example should not be understood as a limitation on this application.

A corresponding channel impulse response may be calculated by using the channel estimation on each carrier. For calculation of the channel impulse response, the following provides an example for description. It is assumed that a channel estimation obtained by a user at a location at a time point is $h=[h_1, \ldots, h_m, \ldots h_M]$, where $h_m$ represents a channel estimation on an $m_{th}$ subcarrier, and a total quantity of subcarriers is M. Inverse discrete Fourier transform (Inverse Discrete Fourier Transform, IDFT for short) or inverse fast Fourier transform (Inverse Fast Fourier Transform, IFFT for short) is performed on the channel estimation. If a coefficient of the Fourier transform is L and $L \geq M$, L-point IDFT or IFFT is performed for the channel estimation to obtain a sequence having a length L, namely, a channel impulse response. Optionally, to reduce a sending amount, the channel impulse response whose length is L may be filtered, to extract valid information for transmission. A specific process may be as follows:

(1) The channel estimation obtained from the reference signal is $h=[h_1, \ldots, h_m, \ldots h_M]$.

(2) Add zeros symmetrically on both sides of the channel estimation to obtain a channel estimation sequence $h'=[0, \ldots, 0, h_1, \ldots, h_m, \ldots h_M, 0, \ldots, 0]=[h'_1, \ldots, h'_l, \ldots, h'_L]$ whose length is L.

(3) Perform an IDFT or IFFT operation on the zero-padded sequence h' to obtain a channel impulse response sequence $f'=[f'_1, \ldots, f'_l, \ldots f'_L]$ whose length is also L.

(4) If band-pass filtering needs to be performed, find a point with the largest absolute value in f', and then select K consecutive points including this point to obtain a sequence $f=[f_1, \ldots, f_k, \ldots f_K]$, namely, a channel impulse response obtained after the filtering.

After the channel estimation and the channel impulse response are obtained by using the foregoing method, each group of channel estimations corresponds to one channel impulse response.

Optionally, the UE may periodically report the measurement data to the positioning service function entity. If the UE supports only channel estimation and/or channel impulse response-based location measurement, the measurement data that includes the channel estimation and/or the channel impulse response is reported by default. If the UE supports a plurality of location measurement manners that include the channel estimation and/or the channel impulse response-based manner, measurement data corresponding to a location measurement manner determined based on a preset priority condition may be reported by default, or measurement data corresponding to all the measurement manners may be reported. This application covers reporting of the measurement data that includes the channel estimation and/or the channel impulse response. Certainly, the UE may alternatively report, as indicated by a network side, the corresponding measurement data that includes the channel estimation and/or the channel impulse response, or the UE requests to start location measurement based on a location request of the positioning service function entity.

S102: The positioning service function entity estimates a location of the UE based on the received measurement data, to position the UE.

The positioning service function entity first establishes a model of a correspondence between the measurement data and the location of the UE, and the model may be trained once in advance or periodically. In a training phase, feature information is extracted, by using a machine learning algorithm, from channel estimations and/or channel impulse responses obtained at different locations, to establish a relationship between the channel estimation, the channel impulse response, and the user location. Optionally, the model of the correspondence may be established by using a training method of a neural network, a large amount of input and output data is learned of by using the neural network, the input and output data is classified and summarized, and a relationship between the input data and the output data is found by using a machine learning algorithm. Once there is new input data, an output result may be obtained by using the trained neural network. For the neural network, an output amount may be considered as a function about input data and a weight coefficient. A main purpose of a plurality of times of training is to find a proper weight coefficient, to make a difference between an obtained output amount and a known output amount is the smallest. In this case, the weight coefficient is a corresponding trained neural network model, and the process of continuously adjusting the weight coefficient is also an iterative process. The neural network technology is the related art and is not described herein. This training phase is a machine learning process, and a trained neural network may be used to obtain output data by using new input data.

Figure 3:
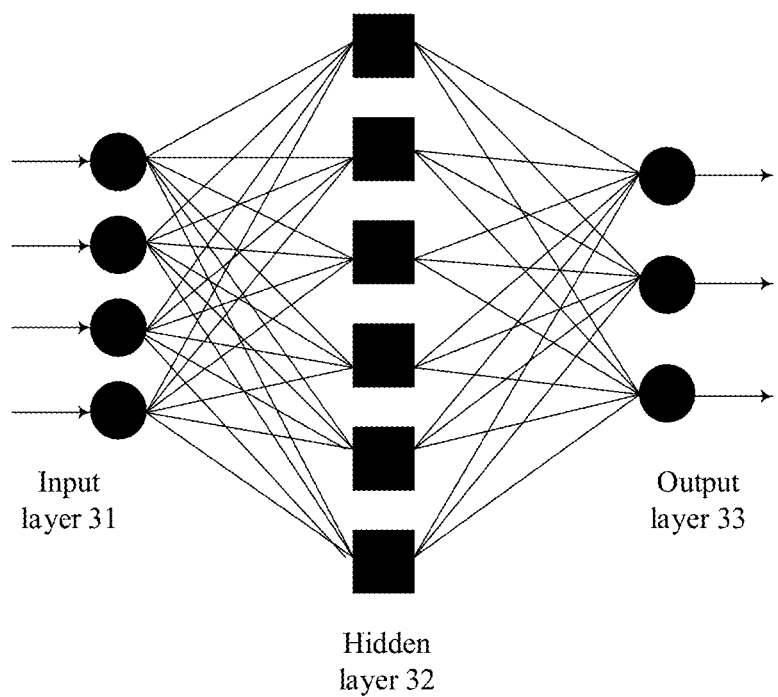
FIG. 3 is an example diagram of a neural network that can be used to establish a model of a correspondence between measurement data and a location of a terminal device according to this application.

In this application, the pre-established model of the correspondence between the measurement data and the location of the UE is used. It is assumed that the model is a neural network model having a structure shown in FIG. 3. FIG. 3 is an example diagram of a neural network that can be used to establish a model of a correspondence between measurement data and a location of a terminal device according to this application. The neural network is divided into three layers: an input layer 31, a hidden layer 32, and an output layer 33. Each of the layers has a specific quantity of neurons, which are nodes. In this model, for example, the input layer 31 has four neurons, the hidden layer 32 has six neurons, and the output layer 33 has three neurons. In a training process, if positioning is performed based on a channel estimation, training is performed, with reference to three outputs corresponding to known UE coordinates, based on four inputs corresponding to the channel estimation, and the three outputs (that is, corresponding to three-dimensional coordinates) corresponding to the UE coordinates. In a positioning process, for an access node/transmission and reception point used during the model training obtaining, the trained model is used to obtain four inputs corresponding to a downlink channel estimation between the access node/transmission and reception point and the UE during location measurement, and the four inputs are input into the trained model. Finally, three outputs corresponding to a location of the UE, namely, three-dimensional coordinates of the UE, are obtained. Therefore, the UE is positioned. The model is merely an example. In an available model in this application, the input layer is not limited to four input neurons, and there may be more than one hidden layer, and six neurons are not limited at the hidden layers. In addition, a neuron at the output layer may adjust a quantity of output neurons based on different to-be-obtained UE location information. Based on a requirement for positioning the UE, if three-dimensional coordinates of the UE need to be obtained, three-dimensional positioning is required, and three output neurons may be selected; or if two-dimensional positioning is required, two output neurons may be selected.

The foregoing is merely an example. In this application, there are three selectable types of measurement data input for location measurement: a first type is a channel estimation, a second type is a channel impulse response, and a third type is a channel estimation and a channel impulse response. The foregoing example is an example of four inputs. A quantity of input neurons is not limited to 4, and different quantities of input neurons may be selected based on a situation during training. It is assumed that N base stations communicate with one UE. If each base station corresponds to M subcarriers, NM channel estimations may be obtained for each location. If the channel estimations are input, because a quantity of the channel estimations is a complex number and the channel estimations are divided into two parts: a real part and an imaginary part, there are 2NM input neurons, and three output neurons, indicating three-dimensional coordinates of a target user. If a channel impulse response is input, assuming that K samples are obtained after filtering, a quantity of channel impulse responses is also a complex number, so that there are 2NK input neurons, and also three output neurons, indicating three-dimensional coordinates of a target user. If a channel estimation and a channel impulse response are input, there are 2NM+2NK input neurons, and also three output neurons, indicating three-dimensional coordinates of a target user.

The foregoing manner of establishing the input-output correspondence model by using the neural network is merely an example, and is not intended to limit this application. In this application, another manner of establishing an input-output correspondence model may be used. For example, an algorithm manner in which learning and training can be performed by using a feedback may be used in this application.

In the manner in which positioning is performed based on the channel estimation and the channel impulse response, after verification, simulation results in a field test environment are shown in Table 1.

TABLE 1

| Parameters | Average positioning accuracy |
| --- | --- |
| Channel estimation | 11 m |
| Channel impulse response | 8 m |
| 2WLS (LTE standard) | 30 m |

It can be learned that in LTE, existing positioning accuracy of, for example, weighted least squares (Weighted Least Squares, WLS for short) based on a AOA and a TOA, is approximately 30 m, positioning accuracy of approximately 11 m may be reached by using a channel estimation, and positioning accuracy of approximately 8 m may be reached by using a channel impulse response. The measurement data in this application is used for positioning, and has more than one time gain compared with the related art.

According to the method for positioning a terminal device in this embodiment of this application, based on the procedure in which the UE reports the measurement data that includes the channel estimation and/or the channel impulse response to the positioning service function entity, high-accuracy and low-limitation UE positioning is implemented.

Embodiment 2

Figure 4:
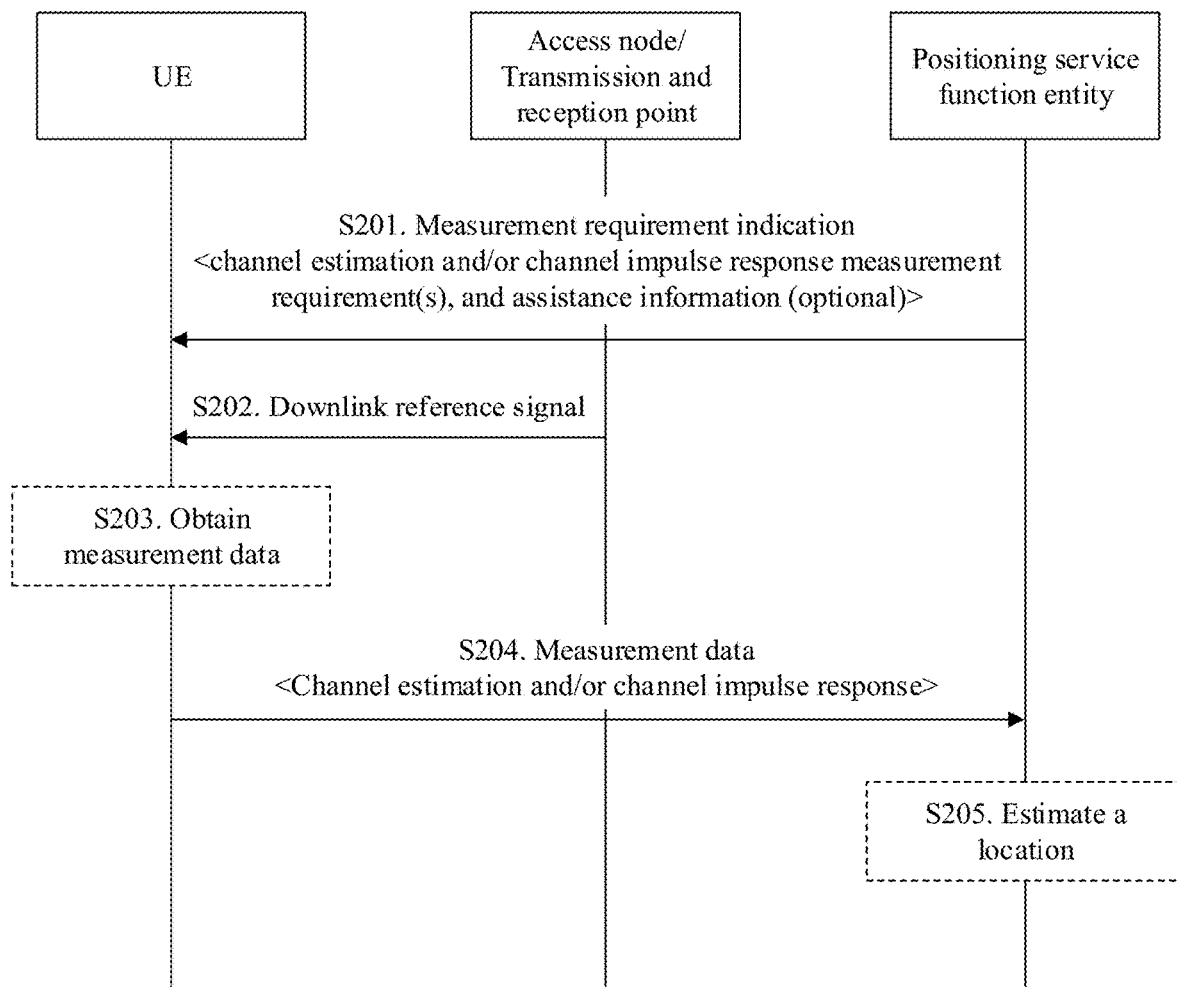
FIG. 4 is a flowchart of a second embodiment of a method for positioning a terminal device according to this application.

FIG. 4 is a flowchart of a second embodiment of a method for positioning a terminal device according to this application. A difference between this embodiment and Embodiment 1 lies in that, in this embodiment, a procedure of exchanging measurement requirement indication information between the UE and the positioning service function entity is added, so that a type of the measurement data obtained by the UE is as indicated by the positioning service function entity. Content that is the same as or similar to that in Embodiment 1 is not described again in this embodiment.

The method includes the following steps.

S201: A positioning service function entity sends, to UE, measurement requirement indication information indicating measurement data that needs to be obtained by the UE, and the UE receives the indication information.

For the measurement data obtained by the UE, the positioning service function entity may instruct, based on a positioning processing manner selected by the positioning service function entity, the UE to obtain the corresponding measurement data for effective positioning. In a scenario in which the UE supports a plurality of positioning manners, the positioning service function entity may further instruct the UE to obtain measurement data corresponding to one or more positioning manners that need to be used. Optionally, the indication information may be carried in a known message or a new message, and may be indicated by using a corresponding bit in the message. For example, when a value of a bit corresponding to measurement data A is 1, it indicates that the UE needs to obtain and report the measurement data A, and a value 0 indicates that the measurement data A does not need to be obtained; or a value 0 indicates that the measurement data A needs to be obtained, and a value 1 indicates that the measurement data A does not need to be obtained. This is an example and constitutes no limitation on this application.

Optionally, the positioning service function entity further sends assistance information to the UE, to assist the UE in location measurement. The assistance information may include a cell number, configuration information of a downlink reference signal, and the like. In this way, the assistance information, for example, the configuration information of the downlink reference signal, can assist the UE in learning of a base station or base stations that sends or send the downlink reference signal, a location at which the downlink reference signal is received. Even if a plurality of access nodes are used to position the UE, the UE can quickly determine a receiving configuration of the downlink reference signal. If the UE has accessed an access node, location measurement is performed based on the single access node, and the configuration information of the downlink reference signal is known, the positioning service function entity may not need to send the assistance information.

Optionally, the assistance information and the indication information may be carried in a same message for sending, or may be carried in different messages for sending.

S202: The UE receives a downlink reference signal sent by an access node/transmission and reception point.

After receiving the measurement requirement indication information sent by the positioning service function entity, the UE performs corresponding measurement. The UE obtains, by receiving the downlink reference signal, the measurement data corresponding to the measurement requirement indication. If the positioning service function entity has sent the assistance information, the UE receives the downlink reference signal based on the assistance information. The UE may receive the downlink reference signal from the access node. If a transmission and reception point that corresponds to the access node and that is disposed with the access node in a distributed manner is disposed in a network, the UE may alternatively receive the downlink reference signal from the corresponding transmission and reception point. For the access node/transmission and reception point that sends the downlink reference signal, an access-side measurement function entity used for uplink location measurement may be disposed on the access node/transmission and reception point, or no measurement function entity may be disposed on the access node/transmission and reception point.

S203: The UE obtains the measurement data based on the indication information and the received downlink reference signal.

The UE obtains the measurement data corresponding to the measurement requirement indication based on the measurement requirement indication information sent by the positioning service function entity and the received downlink reference signal, and if a channel estimation and/or a channel impulse response needs to be measured, the UE performs corresponding measurement, to obtain the channel estimation and/or the channel impulse response.

S204: The UE sends the obtained measurement data to the positioning service function entity, and the positioning service function entity receives the measurement data.

The UE performs corresponding measurement as indicated by the positioning service function entity, obtains corresponding measurement data, and feeds back the measurement data to the positioning service function entity.

S205: The positioning service function entity estimates a location of the UE based on the received measurement data, to position the UE.

The positioning service function entity may use the received measurement data that includes the channel estimation and/or the channel impulse response as an input/inputs based on a pre-established trained model, and calculate location coordinates of the UE.

In this embodiment, in a scenario in which the UE supports a plurality of measurement manners, based on an interaction procedure in which the positioning service function entity sends the measurement requirement indication information to the UE, the UE can perform targeted location measurement and report the measurement data to the positioning service function entity, so that the positioning service function entity effectively estimates the location of the UE, and overheads of invalid location measurement and data transmission of the UE are reduced.

For the foregoing embodiment of terminal device positioning, if in a system, all UEs support channel estimation and/or channel impulse response-based location measurement, the system considers by default that all the UEs support this positioning manner. In this case, the positioning service function entity may select by default that all the UEs have a capability of supporting channel estimation and/or channel impulse response-based location measurement. If in a system, not all UEs have, by default, a capability of supporting channel estimation and/or channel impulse response-based location measurement, the positioning service function entity needs to determine a location measurement capability supported by the UE, to determine whether to position the UE in a channel estimation and/or a channel impulse response-based location measurement manner. For determining, by the positioning service function entity, the location measurement capability supported by the UE, the capability supported by the UE may be learned of by using a UE report, whether the UE supports channel estimation and/or channel impulse response-based on location measurement is determined. The following describes a specific interaction procedure.

Figure 5:
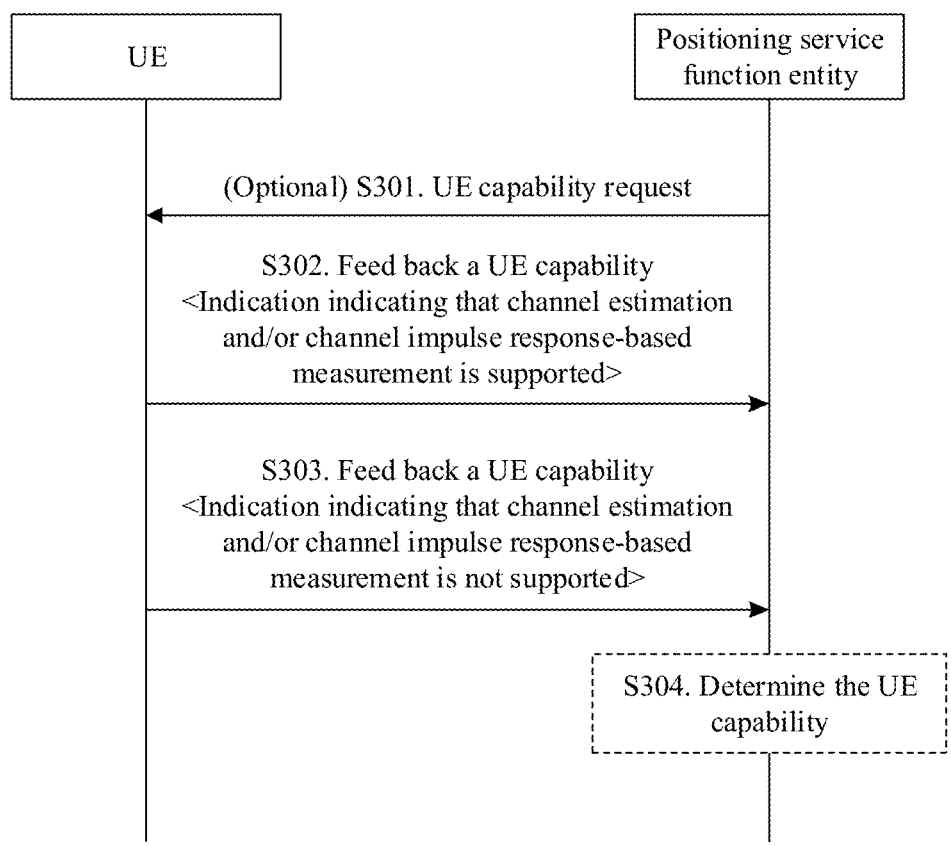
FIG. 5 is a schematic interaction flowchart of determining a location measurement capability supported by a terminal device according to this application.

FIG. 5 is a schematic interaction flowchart of determining a location measurement capability supported by a terminal device according to this application. As shown in FIG. 5, determining of a location measurement capability supported by UE includes the following steps.

S301: A positioning service function entity sends a capability request of UE to the UE.

This step is an optional step. It may be understood that determining, by the positioning service function entity, the location measurement capability supported by the UE may be initiated, when necessary, by sending the capability request, to instruct the UE to feed back the location measurement capability supported by the UE; or may be initiated by the UE. For example, the UE may report the location measurement capability during network access, dynamically report the location measurement capability when a change occurs, or periodically report the location measurement capability. The positioning service function entity sends the capability request, so that UE feedback can be triggered as required, thereby reducing overheads caused by frequent reporting of the UE.

If the capability request is sent to the UE, optionally, the capability request may be carried in an existing message for sending, or may be carried in a new message for sending.

It should be noted that the following steps S302 and S303 are not sequential steps in the procedure, and the two steps are two processing manners in different cases in which the UE has the location measurement capability.

S302: The UE feeds back the capability supported by the UE to the positioning service function entity, where the capability indicates that the UE supports channel estimation and/or channel impulse response-based measurement.

The UE may indicate, in a manner such as by using a specific field or some bits in a message fed back to the positioning service function entity, whether the UE supports some capabilities. Optionally, if there are a plurality of location measurement manners in a system, information about values such as 0 and 1 is used in indication bits corresponding to the positioning manners, to indicate whether the UE supports this capability.

Optionally, if the UE has a capability of detecting a channel estimation and/or a channel impulse response, after the foregoing request is received, 1-bit information is added to related capability information in the message. For example, if a value of the bit is 1, it indicates that the UE can detect the channel estimation and/or the channel impulse response. This example is not a limitation on this application, and a value 0 of the bit may alternatively be used to indicate that the UE supports the capability.

S303: The UE feeds back the capability supported by the UE to the positioning service function entity, where the capability indicates that the UE does not support channel estimation and/or channel impulse response-based measurement.

The UE may indicate, in a manner such as by using a specific field or some bits in a message fed back to the positioning service function entity, whether the UE supports some capabilities. Optionally, if there are a plurality of location measurement manners in a system, information about values such as 0 and 1 is used in indication bits corresponding to the positioning manners, to indicate whether the UE supports this capability.

Optionally, if the UE does not have a capability of detecting a channel estimation and/or a channel impulse response, after the foregoing request is received, 1-bit information is added to related capability information in the message. For example, if a value of the bit is 0, it indicates that the UE cannot detect the channel estimation and/or the channel impulse response. This example is not a limitation on this application, and a value 1 of the bit may alternatively be used to indicate that the UE does not support the capability.

S304: The positioning service function entity determines the capability of the UE based on received UE capability feedback information.

The positioning service function entity can determine, based on the UE capability feedback information, whether the UE supports the channel estimation and/or the channel impulse response-based location measurement, and further determine whether to estimate a location of the UE in this manner. When the positioning service function entity confirms that the UE supports this manner, the location of the UE may be estimated separately with reference to the manners in Embodiment 1 and Embodiment 2. With reference to Embodiment 1, the positioning service function entity may determine the location measurement capability of the UE based on the capability information reported by the UE before step S101 in which the UE reports the measurement data; or the positioning service function entity may determine the location measurement capability of the UE and position the UE, when the UE reports the location measurement capability and the related measurement data together. With reference to Embodiment 2, the positioning service function entity may determine the location measurement capability of the UE before sending the measurement requirement indication information in step S201, and send the measurement requirement indication information to the UE based on the location measurement capability of the UE.

It should be noted that the determining of the UE capability is not limited to the determining of the UE capability based on reporting of the UE. Optionally, if the UE capability is static and fixed, the capability supported by the UE may alternatively be obtained by using a management party (for example, a device capability register function entity). The positioning service function entity may select to interact with the management party, to determine the positioning capability supported by the UE.

In this design, the positioning service function entity can determine a location measurement manner that can be supported by the UE, thereby effectively implementing positioning.

Embodiment 3

Figure 6:
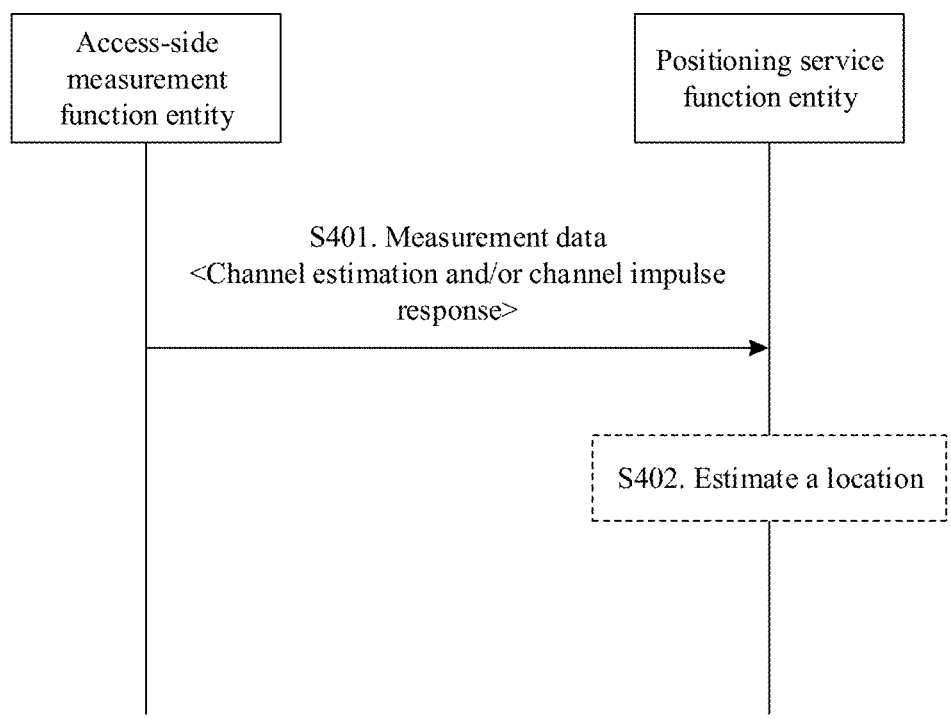
FIG. 6 is a flowchart of a first embodiment of another method for positioning a terminal device according to this application.

According to an embodiment of this application, FIG. 6 is a flowchart of a first embodiment of another method for positioning a terminal device according to this application. For ease of understanding of the solutions, during description, this embodiment and subsequent embodiments are described as a whole from perspectives of a plurality of interaction parties. However, it is not limited to a case in which steps on all interaction sides in a system need to be performed together. In the technical solutions provided in this application, improvements are made on each side in the system. Explanations and details of same content as those in the foregoing embodiment are not described herein again.

The method includes the following steps.

S401: An access-side measurement function entity sends measurement data to a positioning service function entity, and the positioning service function entity receives the measurement data.

The measurement function entity may be disposed on an access node, or may be disposed separately from the access node. One manner may be that the measurement function entity is disposed on a transmission and reception point corresponding to the access node. It may be understood that the measurement function entity has been obtained the measurement data before sending the measurement data to the positioning service function entity. In this application, the measurement function entity can perform location measurement based on an uplink reference signal sent by UE, to obtain the measurement data, specifically including a channel estimation and/or a channel impulse response. The uplink signal sent by the UE may be a non-specific additional uplink reference signal that is used for positioning and that is sent by activated UE. The uplink signal is, for example, an uplink reference signal, such as a sounding reference signal (Sounding Reference Signal, SRS for short), used for uplink channel quality measurement, an uplink channel estimation, and phase tracking; or an uplink tracking reference signal sent by UE in an inactive state in a user-centric network; or a dedicated uplink positioning reference signal; or a dedicated additional positioning reference signal.

A channel estimation on each carrier may be calculated by using the received uplink reference signal sent by the UE, and then a corresponding channel impulse response may be calculated. For related descriptions and obtaining manners of the channel estimation and the channel impulse response, refer to Embodiment 1, and details are not described herein again.

Optionally, the measurement function entity may periodically report the measurement data to the positioning service function entity. If the measurement function entity supports only channel estimation and/or channel impulse response-based location measurement, the measurement data that includes the channel estimation and/or the channel impulse response is reported by default. If the measurement function entity supports a plurality of location measurement manners that include the channel estimation and/or the channel impulse response-based manner, measurement data corresponding to a location measurement manner determined based on a preset priority condition may be reported by default, or measurement data corresponding to all measurement manners may be reported. This application covers reporting of the measurement data that includes the channel estimation and/or the channel impulse response. Certainly, the measurement function entity may alternatively report, as indicated by a network side, the corresponding measurement data that includes the channel estimation and/or the channel impulse response.

S402: The positioning service function entity estimates a location of the UE based on the received measurement data, to position the UE.

The positioning service function entity first establishes a model of a correspondence between the measurement data and the location of the UE. For an example of a related establishment manner, refer to the descriptions in Embodiment 1, and details are not described herein again. The positioning service function entity obtains the measurement data that is reported by the measurement function entity and that is obtained through location measurement based on the uplink reference signal sent by the UE, and obtains, based on the measurement data by using the pre-established model of the correspondence between the measurement data and the location of the UE, an output related to the location of the UE, thereby positioning the UE.

According to the method for positioning a terminal device in this embodiment of this application, based on the interaction procedure in which the measurement function entity reports the measurement data that includes the channel estimation and/or the channel impulse response to the positioning service function entity, high-accuracy and low-limitation UE positioning is implemented.

Embodiment 4

Figure 7:
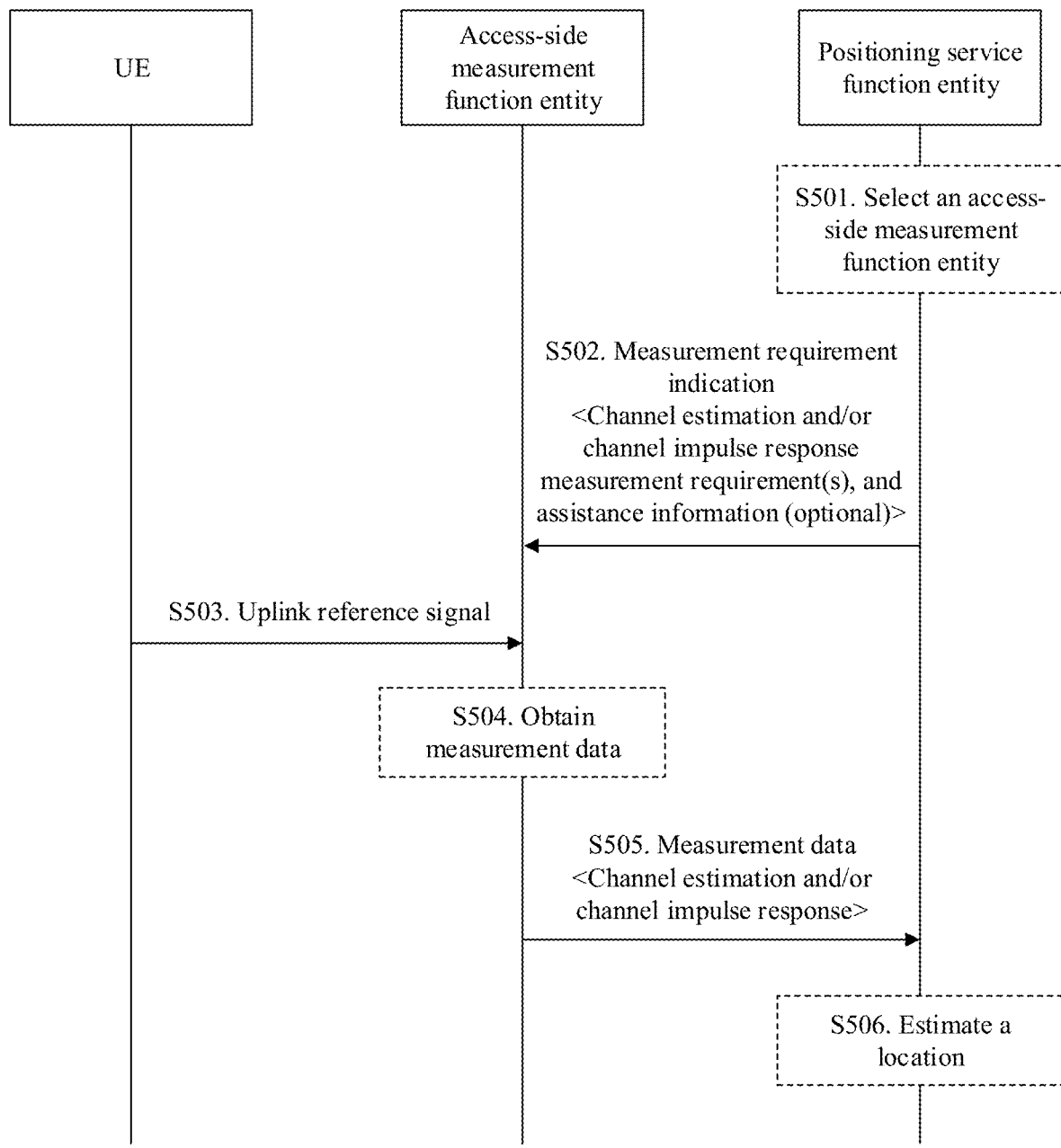
FIG. 7 is a flowchart of a second embodiment of another method for positioning a terminal device according to this application.

FIG. 7 is a flowchart of a second embodiment of another method for positioning a terminal device according to this application. A difference between this embodiment and Embodiment 3 lies in that, in this embodiment, a procedure of exchanging measurement requirement indication information between the access-side measurement function entity and the positioning service function entity is added, and a type of the measurement data obtained by the measurement function entity is as indicated by the positioning service function entity. Content that is the same as or similar to that in Embodiment 3 is not described again in this embodiment.

The method includes the following steps.

S501: A positioning service function entity selects an access-side measurement function entity for performing UE location measurement.

This step is an optional step. If in a system, the measurement function entity used for positioning UE is not a default measurement function entity, for example, an access node (the measurement function entity is disposed on the access node) that provides a service for the UE and that the UE has accessed, or a measurement apparatus (the measurement function entity is disposed on the measurement apparatus) disposed with the access node in a distributed manner, the positioning service function entity further needs to select one or more measurement function entities, a specific selection method example is as follows: If one measurement function entity is selected, an access node serving a user and a measurement function entity corresponding to the access node may be selected. If a plurality of measurement function entities are selected, in addition to the access node serving the user, other access nodes that receive the strongest signal from the user and measurement function entities corresponding to the access nodes are selected, and then indication information is sent to the corresponding measurement function entities. The selection manner is not limited to the foregoing several examples.

S502: The positioning service function entity sends, to the access-side measurement function entity, measurement requirement indication information indicating measurement data that needs to be obtained by the access-side measurement function entity, and the access-side measurement function entity receives the indication information.

The measurement data obtained by the access-side measurement function entity may be indicated by the positioning service function entity based on a positioning processing manner selected by the positioning service function entity, to instruct the access-side measurement function entity to obtain corresponding measurement data, thereby effectively positioning the UE. In a scenario in which the access-side measurement function entity supports a plurality of positioning manners, the positioning service function entity may further instruct the access-side measurement function entity to obtain measurement data corresponding to one or more positioning manners that need to be used. Optionally, the indication information may be carried in a known message or a new message, and may be indicated by using a corresponding bit in the message. For example, when a value of a bit corresponding to measurement data A is 1, it indicates that the access-side measurement function entity needs to obtain and report the measurement data A, and a value 0 indicates that the measurement data A does not need to be obtained; or a value 0 indicates that the measurement data A needs to be obtained, and a value 1 indicates that the measurement data A does not need to be obtained. This is an example and constitutes no limitation on this application.

Optionally, the positioning service function entity further sends assistance information to the access-side measurement function entity, to assist the access-side measurement function entity in location measurement. The assistance information may include a number of a cell in which the UE is located, configuration information of an uplink reference signal, and the like, so that the assistance information, for example, the configuration information of the uplink reference signal, can assist the access-side measurement function entity in learning of UE that sends the uplink reference signal, and a location at which the uplink reference signal is received. If the to-be-positioned UE has accessed an access node corresponding to a measurement function entity, performs location measurement based on the single access node, and has known that the UE needs to be positioned and the configuration information of the uplink reference signal, the positioning service function entity may not need to send the assistance information.

Optionally, the assistance information and the indication information may be carried in a same message for sending, or may be carried in different messages for sending.

S503: The access-side measurement function entity receives the uplink reference signal sent by the UE.

After receiving the measurement requirement indication information sent by the positioning service function entity, the access-side measurement function entity performs corresponding measurement. The access-side measurement function entity obtains, by receiving the uplink reference signal sent by the to-be-positioned UE, the measurement data corresponding to the measurement requirement indication. If the positioning service function entity has sent the assistance information, the access-side measurement function entity receives the uplink reference signal based on the assistance information.

S504: The access-side measurement function entity obtains the measurement data based on the indication information and the received uplink reference signal.

The access-side measurement function entity obtains the measurement data corresponding to the measurement requirement indication based on the measurement requirement indication information sent by the positioning service function entity and the received uplink reference signal, and if a channel estimation and/or a channel impulse response needs to be measured, the access-side measurement function entity performs corresponding measurement, to obtain the channel estimation and/or the channel impulse response.

S505: The access-side measurement function entity sends the obtained measurement data to the positioning service function entity, and the positioning service function entity receives the measurement data.

The access-side measurement function entity performs corresponding measurement as indicated by the positioning service function entity, obtains the corresponding measurement data, and feeds back the measurement data to the positioning service function entity.

S506: The positioning service function entity estimates a location of the UE based on the received measurement data, to position the UE.

The positioning service function entity may use the received measurement data that includes the channel estimation and/or the channel impulse response as an input/inputs based on a pre-established trained model, and calculate location coordinates of the UE.

In this embodiment, in a scenario in which the access-side measurement function entity supports a plurality of measurement manners, based on the interaction procedure in which the positioning service function entity sends the measurement requirement indication information to the access-side measurement function entity, the access-side measurement function entity can perform targeted location measurement and report the measurement data to the positioning service function entity, so that the positioning service function entity effectively estimates the location of the UE, and overheads of invalid location measurement and data transmission performed by the access-side measurement function entity are also reduced.

For the foregoing embodiment in which an access side performs positioning of the terminal device, if all measurement function entities on the access side support channel estimation and/or channel impulse response-based location measurement in a system, the system considers by default that the access side supports this positioning manner. In this case, the positioning service function entity may select all the measurement function entities on the access side by default to have a capability of supporting channel estimation and/or channel impulse response-based location measurement. If not all the measurement function entities on the access side have the capability of supporting the channel estimation and/or the channel impulse response-based location measurement by default in the system, the positioning service function entity needs to determine a location measurement capability supported by the access-side measurement function entity, to determine whether a channel estimation and/or a channel impulse response-based location measurement manner is used to position the UE. The following describes a specific interaction procedure.

Figure 8:
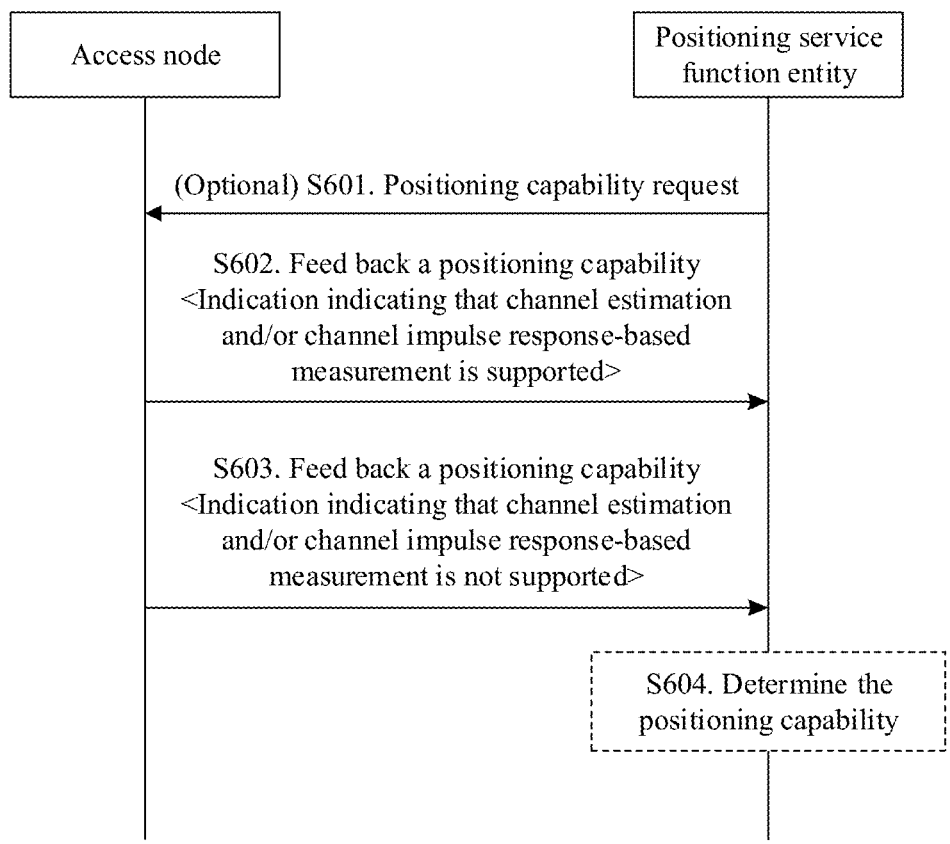
FIG. 8 is a schematic interaction flowchart of determining a location measurement capability supported by an access-side measurement function entity according to this application.

The access-side measurement function entity may be disposed on an access node, or disposed on an apparatus that is disposed in a distributed manner with the corresponding access node. One implementation may be that the access-side measurement function entity is disposed on a transmission and reception point TRP corresponding to the access node. The positioning service function entity determines a location capability supported by the access-side measurement function entity. For scenarios of different disposed manners of the measurement function entity, that is, regardless of whether the measurement function entity is disposed on the access node, the positioning service function entity may determine the location capability supported by the measurement function entity by using the access node corresponding to the measurement function entity (namely, an access node serving as the access-side measurement function entity or an access node managing the access-side measurement function entity). The following uses an example in which the positioning service function entity interacts with the access node to determine the location measurement capability of the measurement function entity for description. FIG. 8 is a schematic interaction flowchart of determining a location measurement capability supported by an access-side measurement function entity according to this application. As shown in FIG. 8, determining of a location measurement capability supported by an access-side measurement function entity includes the following steps.

S601: A positioning service function entity sends a positioning capability request to an access node corresponding to the access-side measurement function entity.

This step is an optional step. It may be understood that, determining, by the positioning service function entity, the location measurement capability supported by the access-side measurement function entity may be initiated, when necessary, by sending the positioning capability request, to instruct the corresponding access node to feed back the location measurement capability supported by the access-side measurement function entity; or may be initiated by the corresponding access node. For example, the corresponding access node may report the location measurement capability during network access, dynamically report the location measurement capability when a change occurs, or periodically report the location measurement capability. The positioning service function entity sends the capability request, so that positioning capability feedback can be triggered as required, thereby reducing overheads caused by frequent reporting by the access node.

If the capability request is sent to the access node, optionally, the capability request may be carried in an existing message for sending, or may be carried in a new message for sending.

It should be noted that the following steps S602 and S603 are not sequential steps in the procedure, and the two steps are two processing manners in different cases in which the access-side measurement function entity has the location measurement capability.

S602: The access node corresponding to the access-side measurement function entity feeds back the capability supported by the access node or the corresponding measurement function entity to the positioning service function entity, where the capability indicates that channel estimation and/or channel impulse response-based measurement is supported.

The access node may indicate, in a manner such as by using a specific field or some bits in a message fed back to the positioning service function entity, whether the access node or the measurement function entity corresponding to the access node supports some capabilities. Optionally, if there are a plurality of location measurement manners in a system, information about values such as 0 and 1 is used in indication bits corresponding to the positioning manners, to indicate whether this capability is supported.

Optionally, for the access node, if the access node or the corresponding measurement function entity has a capability of detecting a channel estimation and/or a channel impulse response, after the foregoing request is received, 1-bit information is added to related capability information in the message. For example, if a value of the bit is 1, it indicates that the channel estimation and/or the channel impulse response can be detected. This example is not a limitation on this application, and a value 0 of the bit may alternatively be used to indicate that the capability is supported.

S603: The access node corresponding to the access-side measurement function entity feeds back the capability supported by the access node or the corresponding measurement function entity to the positioning service function entity, where the capability indicates that channel estimation and/or channel impulse response-based measurement is not supported.

The access node may indicate, in a manner such as by using a specific field or some bits in a message fed back to the positioning service function entity, whether the access node or the corresponding measurement function entity supports some capabilities. Optionally, if there are a plurality of location measurement manners in a system, information about values such as 0 and 1 is used in indication bits corresponding to the positioning manners, to indicate whether this capability is supported.

Optionally, for the access node, if the access node or the corresponding measurement function entity does not have a capability of detecting a channel estimation and/or a channel impulse response, after the foregoing request is received, 1-bit information is added to related capability information in the message. For example, if a value of the bit is 0, it indicates that the channel estimation and/or the channel impulse response cannot be detected. This example is not a limitation on this application, and a value 1 of the bit may alternatively be used to indicate that the capability is not supported.

S604: The positioning service function entity determines the positioning capability of the access-side measurement function entity based on received capability feedback information.

The positioning service function entity can determine, based on the access node feedback information, whether the access node or the measurement function entity corresponding to the access node supports the channel estimation and/or the channel impulse response-based location measurement, and further determine whether to estimate the location of the UE in this manner. When the positioning service function entity confirms that this manner is supported, the location of the UE may be estimated separately with reference to the manners in Embodiment 3 and Embodiment 4 separately. With reference to Embodiment 3, the location measurement capability determined by the positioning service function entity may be determined by using the capability information reported by the access-side measurement function entity or the management entity corresponding to the access-side measurement function entity before the access-side measurement function entity reports the measurement data in step S401; or determined by the access-side measurement function entity or the management entity corresponding to the access-side measurement function entity by reporting the location measurement capability and related measurement data together. With reference to Embodiment 4, the positioning service function entity may determine the location measurement capability of the measurement function entity before selecting the measurement function entity in step S501, and select the measurement function entity based on the location measurement capability of the measurement function entity. If step S501 does not need to be performed, the positioning service function entity may determine the location measurement capability of the measurement function entity before sending the measurement requirement indication information to the measurement function entity in S502.

It should be noted that, the determining of the capability of the access-side measurement function entity is not limited to the determining based on reporting of the access node serving as the access-side measurement function entity or the access node managing the access-side measurement function entity. Optionally, the capability supported by the access-side measurement function entity may alternatively be obtained by another management party (for example, a management entity such as operation administration and maintenance (Operation Administration and Maintenance, OAM for short), and the positioning service function entity may select to interact with another management party, to determine the positioning capability supported by the measurement function entity.

In this design, the positioning service function entity can determine a location measurement manner that can be supported by the access-side measurement function entity, thereby effectively implementing positioning.

The estimation of the location of the UE in the foregoing embodiment is separately described from a perspective that a UE side sends channel estimation and/or channel impulse response-based location measurement data and an access side sends channel estimation and/or channel impulse response-based location measurement data. It may be understood that the positioning service function entity may estimate the location of the UE based on the measurement data reported by the UE, or based on the measurement data reported by the access side, or according to the measurement data reported by both the UE and the access side. The following focuses on descriptions from a perspective of estimating the location by the positioning service function entity.

Embodiment 5

Figure 9:
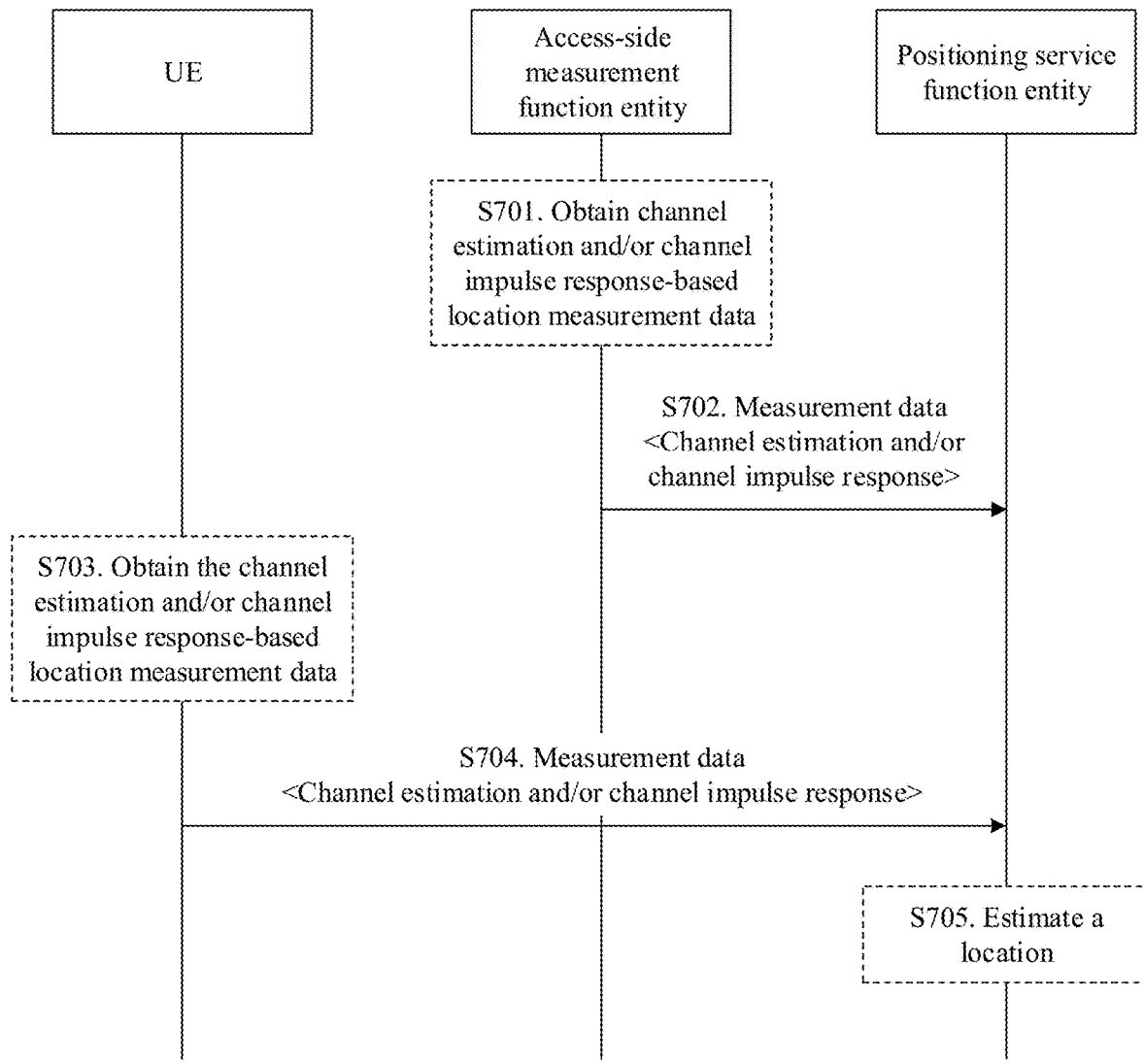
FIG. 9 is a flowchart of an embodiment of another method for positioning a terminal device according to this application.

FIG. 9 is a flowchart of an embodiment of another method for positioning a terminal device according to this application. This embodiment mainly describes a calculation method for a location estimation performed by a positioning service function entity, and only describes main steps related to sending of location measurement data, and this embodiment is not limited to including only these steps. The method may further include other related steps in Embodiment 2 and/or Embodiment 3. For details, refer to the foregoing embodiment, and details are not described herein again.

The method includes the following steps.

S701: An access-side measurement function entity obtains channel estimation and/or channel impulse response-based location measurement data.

S702: The access-side measurement function entity sends the channel estimation and/or the channel impulse response-based location measurement data to the positioning service function entity, and the positioning service function entity receives the location measurement data.

S701 is similar to S504 in the foregoing embodiment, and S702 is similar to S401 and S505 in the foregoing embodiment. For details, refer to the descriptions of S401, S504, and S505, and details are not described herein again.

S703: UE obtains the channel estimation and/or the channel impulse response-based location measurement data.

S704: The UE sends the channel estimation and/or the channel impulse response-based location measurement data to the positioning service function entity, and the positioning service function entity receives the location measurement data.

S703 is similar to S203 in the foregoing embodiment, and S704 is similar to S101 and S204 in the foregoing embodiment. For details, refer to the descriptions of S101, S203, and S204, and details are not described herein again.

It should be noted that, S701, S702, S703, and S704 are not necessarily performed in a particular sequence, and are merely for objects on which different actions are performed. Neither of them is mandatory. In different scenarios, S701 and S702 may not exist, or S703 and S704 may not exist.

S705: The positioning service function entity estimates a location of the UE based on the received location measurement information, to implement positioning.

The positioning service function entity may estimate the location of the UE based on the measurement data reported by the UE and/or the access-side measurement function entity. For estimation of the location of the UE based on the measurement information reported by the UE or the access-side measurement function entity, refer to the manners described in S102 and S205 or S402 and S506 in the foregoing embodiment to estimate the location of the UE. For estimation of the location of the UE based on the measurement information reported by the UE and the access-side measurement function entity, refer to the manners described in S102 and S205, and S402 and S506 in the foregoing embodiments. Optionally, when a model of a correspondence between the measurement data and the location of the UE is established, both the measurement data obtained by a UE side and the measurement data obtained by an access side may be considered, and during positioning, the location of the UE is estimated based on the established correspondence model, and the measurement data reported by the UE side and the measurement data reported by the access side. Optionally, when the model of the correspondence between the measurement data and the location of the UE is established, the measurement data obtained by the UE side and the measurement data obtained by the access side may be separately considered. To be specific, there are correspondence models respectively for the UE side and the access side, during positioning, a location estimation result obtained based on the measurement data reported by the UE and a location estimation result obtained based on the measurement data reported by the access side are averaged to determine the final location of the UE.

A positioning system in this application may perform positioning for a single access node/access-side measurement function entity, or for a plurality of access nodes/access-side measurement function entities. For the positioning service function entity, for the two scenarios, the channel estimation and/or the channel impulse response-based positioning method may further be described by using the example of the neural network that is provided above.

For the single access node/access-side measurement function entity, in a training phase, a downlink channel estimation and/or channel impulse response is used as an input amount, and output coordinates are represented as a function related to a weight coefficient and an offset coefficient of each node in the neural network and the input amount, and a training purpose is to adjust the weight coefficient and the offset coefficient of each node in the neural network through iteration, so that a mean square error between output location coordinates obtained after the training and known location coordinates is as small as possible. An iteration process may be stopped after a preset quantity of times or when the mean square error is less than a preset value. Then, in a positioning phase, after receiving the downlink channel estimation and/or channel impulse response, a location center obtains the output location coordinates, namely, location coordinates of a user, based on the trained neural network and by using the trained weight coefficient and offset coefficient.

For the plurality of access nodes/access-side measurement function entities, there may be two methods. In a first method, a training phase is the same as that for the single access node/access-side measurement function entity, and the same quantity of inputs are also used. In a positioning phase, the location center receives a group of downlink channel estimations and/or channel impulse responses from each access node/access-side measurement function entity, so that each access node/access-side measurement function entity can obtain coordinates of a user by using the neural network, and then obtain location coordinates of the user by averaging the obtained location coordinates. In a second method, in a training phase, if there are N access nodes/access-side measurement function entities, N groups of channel estimations and/or channel impulse responses are used as inputs, and location coordinates of one user are still output, and a weight coefficient and an offset coefficient of each node in the trained neural network are obtained after training. Then, in a positioning phase, after receiving a downlink channel estimation and/or channel impulse response of each access node/access-side measurement function entity, the N groups of channel estimations and/or channel impulse responses are used as inputs to obtain location coordinates of the user.

According to the method for positioning a terminal device in this embodiment of this application, based on the interaction procedure in which the UE and/or access-side measurement function entity report/reports the measurement data that includes the channel estimation and/or the channel impulse response to the positioning service function entity, high-accuracy and low-limitation UE positioning is implemented.

The foregoing describes the solutions provided in the embodiments of this application mainly by using a procedure in which various entities in the system interact with each other to position the terminal device. It may be understood that to implement the foregoing functions, the foregoing various entities include hardware structures and/or software modules corresponding to the various functions. A person of ordinary skill in the art should easily be aware that, in combination with the examples described in the embodiments disclosed in this specification, units and algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules of the UE, the access-side measurement function entity, and the positioning service function entity may be divided based on the foregoing method examples. For example, the functional modules may be divided corresponding to functions, or two or more functions may be integrated into one processing module. The integrated module may be implemented in a form of hardware, or may be implemented in a form of a software functional module. It should be noted that, in this embodiment of this application, module division is an example, and is merely logical function division. In an actual implementation, another division manner may be used. An example in which functional modules are divided based on functions is used below for description.

Figure 10:
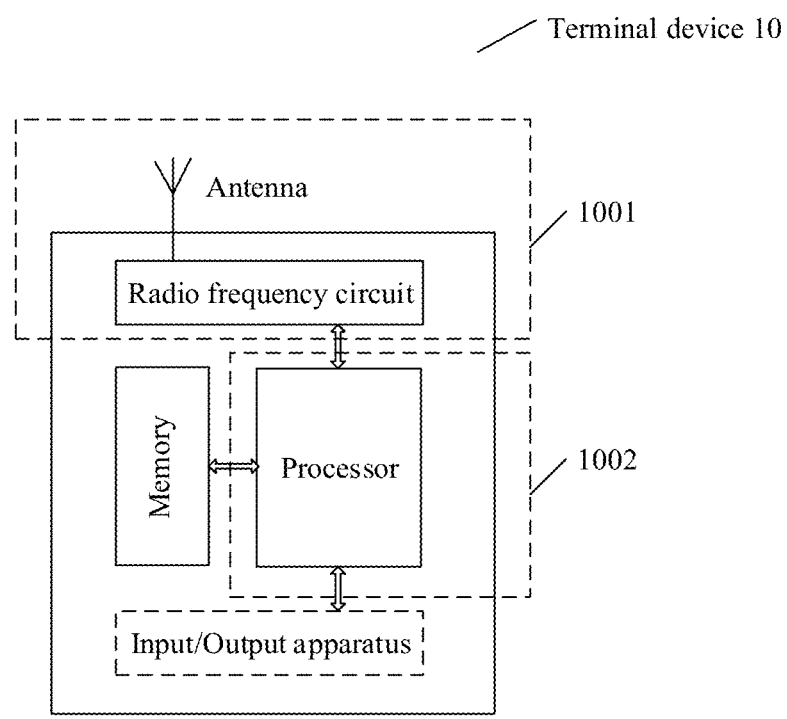
FIG. 10 is a simplified schematic structural diagram of a terminal device according to this application.

An embodiment of this application further provides a terminal device. The terminal device may be configured to perform the steps performed by the UE in any one of FIG. 2, FIG. 4, FIG. 5, FIG. 7, and FIG. 9. FIG. 10 is a simplified schematic structural diagram of a terminal device 10. For ease of understanding and convenience of figure illustration, an example in which a terminal device is a mobile phone is used in FIG. 10. As shown in FIG. 10, the terminal device 10 includes a processor, a memory, a radio frequency circuit, an antenna, and an input/output apparatus. The processor is mainly configured to: process a communication protocol and communication data, control the terminal device 10, execute a software program, process data of the software program, and the like. The memory is mainly configured to store the software program and data. The radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus, such as a touchscreen, a display, or a keyboard, is mainly configured to: receive data input by a user and output data to the user. It should be noted that some types of terminal devices 10 may have no input/output apparatus. The memory and the processor may be integrated together or may be disposed independently. In addition, the radio frequency circuit and the processor may be integrated together or may be disposed independently.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave by using the antenna. When data is sent to the terminal device 10, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 10 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have transmission and reception functions may be considered as a transceiver unit of the terminal device 10, and the processor that has a processing function may be considered as a processing unit of the terminal device 10. As shown in FIG. 10, the terminal device 10 includes a transceiver unit 1001 and a processing unit 1002. The transceiver unit may also be referred to as a transceiver (including a transmitter and/or a receiver), a transceiver machine, a transceiver apparatus, a transceiver circuit, or the like. The processing unit may also be referred to as a processor, a processing board, a processing module, a processing apparatus, or the like. Optionally, a component that is in the transceiver unit 1001 and that is configured to implement a reception function may be considered as a receiving unit, and a component that is in the transceiver unit 1001 and that is configured to implement a transmission function may be considered as a sending unit. In other words, the transceiver unit 1001 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like. In some embodiments, the transceiver unit 1001 and the processing unit 1002 may be integrated together, or may be disposed independently. In addition, all functions of the processing unit 1002 may be integrated into one chip for implementation. Alternatively, some functions may be integrated into one chip for implementation and some other functions are integrated into one or more other chips for implementation. This is not limited in this application.

For example, in an implementation, the transceiver unit 1001 is configured to perform the step performed by the UE in S101 in FIG. 2, and/or other steps in this application. The processing unit 1002 is configured to perform other related steps in the embodiment corresponding to FIG. 2, for example, the step of obtaining and determining, by the UE, to-be-sent measurement data before sending the measurement data in S101, and/or other steps in this application.

For example, in another implementation, the transceiver unit 1001 is configured to perform the step performed by the UE in S201, S202, and/or S204 in FIG. 4, and/or other steps in this application. The processing unit 1002 is configured to perform step S203 in FIG. 4, and/or other steps in this application.

For example, in another implementation, the transceiver unit 1001 is configured to perform the step performed by the UE in S301, S302, and/or S303 in FIG. 5, and/or other steps in this application. The processing unit 1002 is configured to perform other related steps in the embodiment corresponding to FIG. 5, for example, the step of determining the positioning capability supported by the UE, and/or perform other steps in this application.

For example, in another implementation, the transceiver unit 1001 is configured to perform the step performed by the UE in S503 in FIG. 7, and/or other steps in this application. The processing unit 1002 is configured to perform other steps in this application.

For example, in another implementation, the transceiver unit 1001 is configured to perform the step performed by the UE in S704 in FIG. 9, and/or other steps in this application. The processing unit 1002 is configured to perform step S703 in FIG. 9, and/or other steps in this application.

Figure 11:
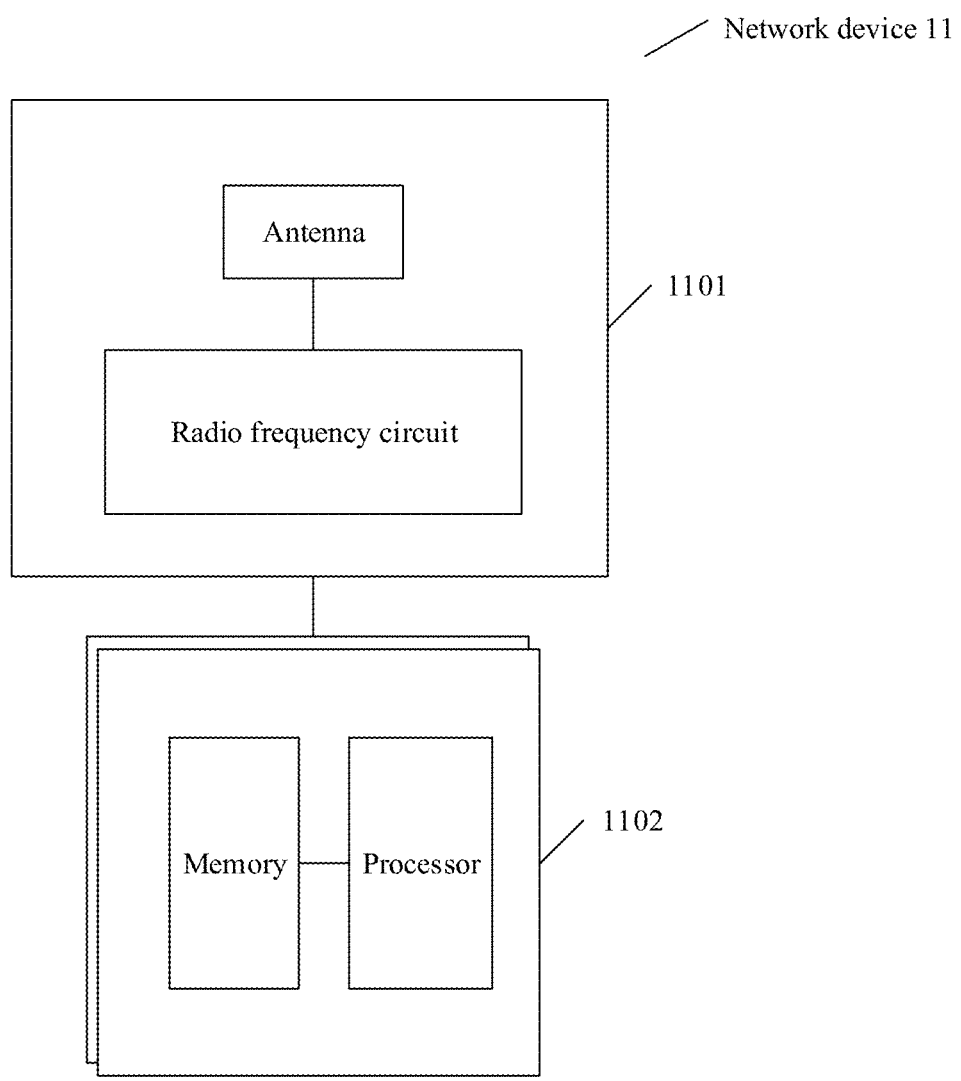
FIG. 11 is a simplified schematic structural diagram of a network device according to this application.

An embodiment of this application further provides a network device. The network device may be used as an access-side measurement function entity to perform the steps performed by the access-side measurement function entity in any one of FIG. 4 and FIG. 6 to FIG. 9, or perform the steps as an access node/transmission and reception point of the access-side measurement function entity. FIG. 11 is a simplified schematic structural diagram of a network device 11. The network device 11 includes a part 1101 and a part 1102. The part 1101 is mainly configured to send and receive a radio frequency signal and perform conversion between the radio frequency signal and a baseband signal. The part 1102 is mainly configured to perform baseband processing, control the network device 11, and the like. The part 1101 may be usually referred to as a transceiver unit, a transceiver machine, a transceiver circuit, a transceiver, or the like. The part 1102 is usually a control center of the network device 11, and may usually be referred to as a processing unit, a control unit, a processor, a controller, or the like. The part 1102 is configured to control the network device 11 to perform the steps performed by the access-side measurement function entity or by the access node/transmission and reception point used as the access-side measurement function entity in the foregoing related embodiments. For details, refer to the foregoing descriptions of the related parts.

The transceiver unit in the part 1101 may also be referred to as a transceiver machine, a transceiver, or the like. The transceiver unit includes an antenna and a radio frequency unit. The radio frequency unit is mainly configured to perform radio frequency processing. Optionally, a component that is in the part 1101 and that is configured to implement a reception function may be considered as a receiving unit, and a component that is configured to implement a transmission function may be considered as a sending unit. In other words, the part 1101 includes the receiving unit and the sending unit. The receiving unit may also be referred to as a receiver, a receiver, a receiver circuit, or the like. The sending unit may be referred to as a transmitter, a transmitter, a transmitter circuit, or the like.

The part 1102 may include one or more boards. Each board may include one or more processors and one or more memories, and the processor is configured to read and execute a program in the memory, to implement a baseband processing function and control the network device 11. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors. The memory and the processor may be integrated together, or may be disposed independently. In some embodiments, the part 1101 and the part 1102 may be integrated together or may be disposed independently. In addition, all functions of the part 1102 may be integrated into one chip for implementation. Alternatively, some functions may be integrated into one chip for implementation and some other functions are integrated into one or more other chips for implementation. This is not limited in this application.

For example, in an implementation, the transceiver unit may be configured to perform the step performed by the access node/transmission and reception point in S202 in FIG. 4, and/or other steps in this application. The processing unit is configured to perform other steps in this application.

For example, in another implementation, the transceiver unit is configured to perform the step performed by the access-side measurement function entity in S401 in FIG. 6, and/or other steps in this application. The processing unit is configured to perform other related steps in the embodiment corresponding to FIG. 6, for example, the step of obtaining and determining, by the access-side measurement function entity, to-be-sent measurement data before sending the measurement data in S401, and/or other steps in this application.

For example, in another implementation, the transceiver unit is configured to perform the step performed by the access-side measurement function entity in S502, S503, and/or S505 in FIG. 7, and/or other steps in this application. The processing unit is configured to perform S504 in FIG. 7, and/or other steps in this application.

For example, in another implementation, the transceiver unit is configured to perform the step performed by the access node in S601, S602, and/or S603 in FIG. 8, and/or other steps in this application. The processing unit is configured to perform other steps in this application.

For example, in another implementation, the transceiver unit is configured to perform the step performed by the access node in S702 in FIG. 9, and/or other steps in this application. The processing unit is configured to perform S701 in FIG. 9, and/or other steps in this application.

Figure 12:
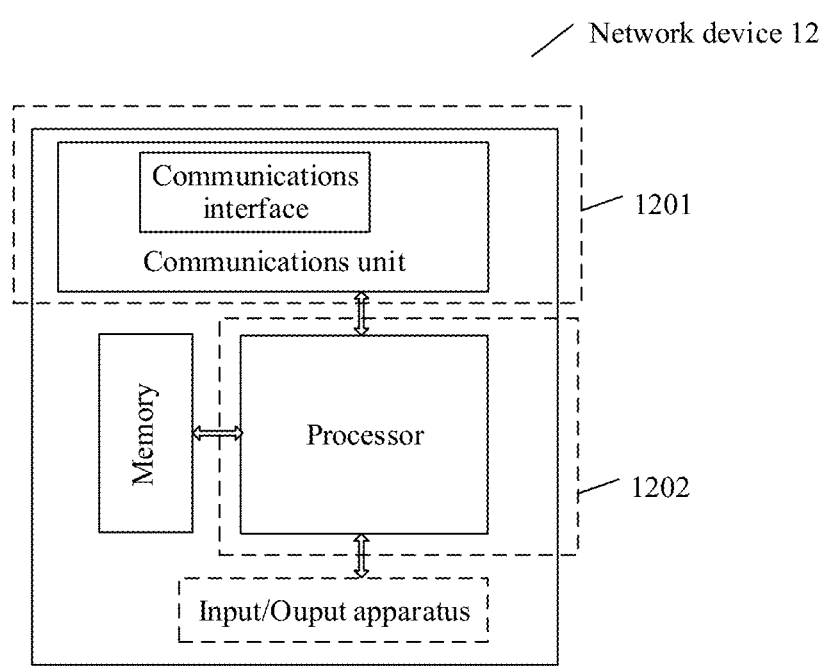
FIG. 12 is another simplified schematic structural diagram of a network device according to this application.

An embodiment of this application further provides another network device. The network device may be used as a positioning service function entity to perform the step performed by the positioning service function entity in any one of FIG. 2 and FIG. 4 to FIG. 9. FIG. 12 is another simplified schematic structural diagram of a network device 12. In FIG. 12, the network device 12 includes a processor, a memory, a communications unit including a communications interface, and an optional input/output apparatus. The processor is mainly configured to: process a communication protocol and communication data, control the network device 12, execute a software program, process data of the software program, and the like. The memory is mainly configured to store the software program and data. The communications unit is mainly configured to perform transmission processing for network communication. The communications interface processes network communication-related interface processing, and is mainly configured to send and receive messages and data. The input/output apparatus, such as an indicator, a touchscreen, a display screen, or a keyboard, is mainly configured to receive data input by an operator and output data to the operator. It should be noted that some types of network devices may have no input/output apparatus. The memory and the processor may be integrated together, or may be disposed independently.

When needing to send data, the processor processes the to-be-sent data, and outputs the to-be-sent data to the communications unit. The communications unit performs interface processing on the to-be-sent data by using the communications interface, and then sends the data to the outside. When data is sent to the network device 12, the communications unit receives the data by using the communications interface, processes the data, and outputs the data to the processor. The processor further processes the data. For ease of description, FIG. 12 shows only one memory and one processor. In an actual device, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, a communications interface and a communications unit that have transmission and reception functions may be considered as a transceiver unit of the network device 12, and a processor that has a processing function may be considered as a processing unit of the network device 12. As shown in FIG. 12, the network device 12 includes a transceiver unit 1201 and a processing unit 1202. The transceiver unit may also be referred to as a transceiver (including a transmitter and/or a receiver), a transceiver machine, a transceiver apparatus, or the like. The processing unit may also be referred to as a processor, a processing board, a processing module, a processing apparatus, or the like. Optionally, a component that is in the transceiver unit 1201 and that is configured to implement a reception function may be considered as a receiving unit, and a component that is in the transceiver unit 1201 and that is configured to implement a transmission function may be considered as a sending unit. In other words, the transceiver unit 1201 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like. In some embodiments, the transceiver unit 1201 and the processing unit 1202 may be integrated together, or may be disposed independently. In addition, all functions of the processing unit 1202 may be integrated into one chip for implementation. Alternatively, some functions may be integrated into one chip for implementation and some other functions are integrated into one or more other chips for implementation. This is not limited in this application.

For example, in an implementation, the transceiver unit 1201 is configured to perform the step performed by the positioning service function entity in S101 in FIG. 2, and/or other steps in this application. The processing unit 1202 is configured to perform S102 in FIG. 2, and/or other steps in this application.

For example, in another implementation, the transceiver unit 1201 is configured to perform the step performed by the positioning service function entity in S201 and/or S204 in FIG. 4, and/or other steps in this application. The processing unit 1202 is configured to perform step S205 in FIG. 4, and/or other steps in this application.

For example, in another implementation, the transceiver unit 1201 is configured to perform the step performed by the positioning service function entity in S301, S302, and/or S303 in FIG. 5, and/or other steps in this application. The processing unit 1202 is configured to perform S304 in FIG. 5, and/or other steps in this application.

For example, in another implementation, the transceiver unit 1201 is configured to perform the step performed by the positioning service function entity in S401 in FIG. 6, and/or other steps in this application. The processing unit 1202 is configured to perform S402 in FIG. 6, and/or other steps in this application.

For example, in another implementation, the transceiver unit 1201 is configured to perform the step performed by the positioning service function entity in S502 and/or S505 in FIG. 7, and/or other steps in this application. The processing unit 1202 is configured to perform S501 and/or S506 in FIG. 7, and/or other steps in this application.

For example, in another implementation, the transceiver unit 1201 is configured to perform the step performed by the positioning service function entity in S601, S602, and/or S603 in FIG. 8, and/or other steps in this application. The processing unit 1202 is configured to perform S604 in FIG. 8, and/or other steps in this application.

For example, in another implementation, the transceiver unit 1201 is configured to perform the step performed by the positioning service function entity in S702 and/or S704 in FIG. 9, and/or other steps in this application. The processing unit 1202 is configured to perform step S705 in FIG. 9, and/or other steps in this application.

For explanations and beneficial effects of related content in any one of the foregoing provided communications positioning system apparatuses, refer to corresponding method embodiments provided above, and details are not described herein again.

This application further provides a system for positioning a terminal. The system includes the positioning service function entity, the UE, and/or the access-side measurement function entity in the foregoing implementations.

This application further provides a computer program product. When the computer program product is run on a computer, the computer is enabled to perform any method provided above. This application further provides a communications chip. The communications chip stores an instruction, and when the instruction is run on each management entity, the management entity is enabled to perform the method provided above.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor/controller or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example descriptions of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A measurement apparatus for positioning a terminal device, wherein the measurement apparatus comprises at least one processor, wherein the at least one processor is configured to execute an instruction in a memory, and cause the apparatus to implement, based on the instruction:
    sending measurement data to a positioning service function entity, wherein the measurement data is obtained based on a received downlink reference signal for the terminal device,
    the measurement data is used by the positioning service function entity to estimate a location of the terminal device; and the measurement data comprises at least one of the following: a channel estimation and a channel impulse response,
    wherein a pre-established neural network model of a correspondence between the measured data and the location of the terminal device is used.

2. The measurement apparatus according to claim 1, wherein the at least one processor is configured to execute the instruction in the memory, and cause the apparatus to further implement, based on the instruction:
    obtaining the measurement data based on the received downlink reference signal.

3. The measurement apparatus according to claim 1, wherein the at least one processor is configured to execute the instruction in the memory, and cause the apparatus to further implement, based on the instruction:
    receiving first indication information sent by the positioning service function entity, wherein the first indication information is used to indicate the measurement data that needs to be obtained by the measurement apparatus.

4. The measurement apparatus according to claim 3, wherein the at least one processor is configured to execute the instruction in the memory, and cause the apparatus to further implement, based on the instruction:
    receiving assistance information sent by the positioning service function entity, wherein the assistance information is used to assist the measurement apparatus in receiving the received downlink reference signal; and the assistance information and the first indication information are carried in a same message and sent by the positioning service function entity, or are carried in different messages and sent by the positioning service function entity.

5. The measurement apparatus according to claim 1, wherein the at least one processor is configured to execute the instruction in the memory, and cause the apparatus to further implement, based on the instruction:
    sending second indication information to the positioning service function entity, wherein the second indication information is used to indicate a location measurement capability of the measurement apparatus.

6. A measurement apparatus for positioning a terminal device, wherein the measurement apparatus comprises at least one processor, wherein the at least one processor is configured to execute an instruction in a memory, and cause the apparatus to implement, based on the instruction:
    sending measurement data to a positioning service function entity, wherein the measurement data is obtained based on an uplink reference signal that is sent by a to-be-positioned terminal device and that is received by the measurement apparatus;
    the measurement data is used by the positioning service function entity to estimate a location of the terminal device; and the measurement data comprises at least one of the following: a channel estimation and a channel impulse response,
    wherein a pre-established neural network model of a correspondence between the measured data and the location of the terminal device is used.

7. The measurement apparatus according to claim 6, wherein the at least one processor is configured to execute the instruction in the memory, and cause the apparatus to further implement, based on the instruction:
    obtaining the measurement data based on the uplink reference signal.

8. The measurement apparatus according to claim 6, wherein the at least one processor is configured to execute the instruction in the memory, and cause the apparatus to further implement, based on the instruction:
    receiving first indication information sent by the positioning service function entity, wherein the first indication information is used to indicate the measurement data that needs to be obtained by the measurement apparatus.

9. The measurement apparatus according to claim 8, wherein the at least one processor is configured to execute the instruction in the memory, and cause the apparatus to further implement, based on the instruction:
    receiving assistance information sent by the positioning service function entity, wherein the assistance information is used to assist the measurement apparatus in receiving the uplink reference signal; and the assistance information and the first indication information are carried in a same message and sent by the positioning service function entity, or are carried in different messages and sent by the positioning service function entity.

10. The measurement apparatus according to claim 6, wherein the at least one processor is configured to execute the instruction in the memory, and cause the apparatus to further implement, based on the instruction:
    sending second indication information to the positioning service function entity, wherein the second indication information is used to indicate a location measurement capability of the measurement apparatus.

11. A method for positioning a terminal device, wherein the method comprises:

sending, by a terminal device, measurement data to a positioning service function entity, wherein the measurement data is obtained based on a downlink reference signal received by the terminal device;

the measurement data is used by the positioning service function entity to estimate a location of the terminal device; and the measurement data comprises at least one of the following: a channel estimation and a channel impulse response, wherein a pre-established neural network model of a correspondence between the measured data and the location of the terminal device is used.

12. The method according to claim 11, wherein before the sending, by the terminal device, the measurement data to the positioning service function entity, the method further comprises:

obtaining the measurement data based on the received downlink reference signal.

13. The method according to claim 11, wherein before the sending, by the terminal device, the measurement data to the positioning service function entity, the method further comprises:

receiving, by the terminal device, first indication information sent by the positioning service function entity, wherein the first indication information is used to indicate the measurement data that needs to be obtained by the terminal device.

14. The method according to claim 13, wherein before the sending, by the terminal device, the measurement data to the positioning service function entity, the method further comprises:

receiving, by the terminal device, assistance information sent by the positioning service function entity, wherein the assistance information is used to assist the terminal device in receiving the downlink reference signal; and the assistance information and the first indication information are carried in a same message and sent by the positioning service function entity, or are carried in different messages and sent by the positioning service function entity.

15. The method according to claim 11, wherein the method further comprises: sending, by the terminal device, second indication information to the positioning service function entity, wherein the second indication information is used to indicate a location measurement capability of the terminal device.

* * * * *